US011806606B2

(12) United States Patent
Kishimoto et al.

(10) Patent No.: US 11,806,606 B2
(45) Date of Patent: Nov. 7, 2023

(54) LIGHT GUIDE PLATE, LIGHT EMITTING DEVICE, DISPLAY DEVICE AND GAME MACHINE

(71) Applicant: OMRON Corporation, Kyoto (JP)

(72) Inventors: Jun Kishimoto, Ogaki (JP); Yoshihiko Takagi, Kyoto (JP)

(73) Assignee: OMRON Corporation, Kyoto (JP)

( * ) Notice: Subject to any disclaimer, the term of this patent is extended or adjusted under 35 U.S.C. 154(b) by 708 days.

(21) Appl. No.: 16/963,296

(22) PCT Filed: Jan. 10, 2019

(86) PCT No.: PCT/JP2019/000596
§ 371 (c)(1),
(2) Date: Jul. 20, 2020

(87) PCT Pub. No.: WO2019/159574
PCT Pub. Date: Aug. 22, 2019

(65) Prior Publication Data
US 2021/0370161 A1 Dec. 2, 2021

(30) Foreign Application Priority Data

Feb. 15, 2018 (JP) ................................ 2018-024699

(51) Int. Cl.
*A63F 7/02* (2006.01)
*G09F 13/18* (2006.01)
(Continued)

(52) U.S. Cl.
CPC .............. *A63F 7/027* (2013.01); *G02B 30/35* (2020.01); *G09F 3/18* (2013.01); *G09F 2013/189* (2013.01)

(58) Field of Classification Search
CPC ........... A63F 7/027; A63F 7/02; G02B 30/35; G02B 27/22; G09F 13/18; G09F 13/00
See application file for complete search history.

(56) References Cited

U.S. PATENT DOCUMENTS

2014/0118825 A1* 5/2014 Shikii .................... G02B 30/35
359/464
2015/0092441 A1 4/2015 Takagi et al.
(Continued)

FOREIGN PATENT DOCUMENTS

JP 2012-118378 A 6/2012
JP 2015-87769 A 5/2015
(Continued)

OTHER PUBLICATIONS

An English translation of the International Search Report ("ISR") of PCT/JP2019/000596 dated Mar. 5, 2019.
(Continued)

*Primary Examiner* — Raleigh W Chiu
(74) *Attorney, Agent, or Firm* — METROLEX IP LAW GROUP, PLLC

(57) ABSTRACT

A light guide plate for presenting a stereoscopic image via parallax includes: a plurality of deflectors arranged in rows parallel to an incidence surface through which light from a light source enters the light guide plate, the light totally reflecting inside the light guide plate while being guided therethrough, the plurality of deflectors including a reflection surface for reflecting and causing an emission surface to emit said light; and the reflection surfaces in a row of the plurality of deflectors are all oriented in the same direction with the orientation of the reflection surfaces changing for each row in accordance with distance from the incidence surface.

19 Claims, 24 Drawing Sheets

(51) Int. Cl.
    *G09F 13/00*     (2006.01)
    *G02B 30/35*     (2020.01)
    *G09F 3/18*     (2006.01)

(56) References Cited

U.S. PATENT DOCUMENTS

| | | | | |
|---|---|---|---|---|
| 2019/0107728 | A1* | 4/2019 | Kim | H04N 13/363 |
| 2019/0235263 | A1* | 8/2019 | Shinohara | F21S 2/00 |
| 2020/0124870 | A1* | 4/2020 | Otsubo | G02B 30/35 |
| 2021/0255477 | A1* | 8/2021 | Otsubo | G02B 5/09 |
| 2021/0370161 | A1* | 12/2021 | Kishimoto | A63F 7/027 |

FOREIGN PATENT DOCUMENTS

| | | | | |
|---|---|---|---|---|
| WO | 2016006525 A1 | | 1/2016 | |
| WO | WO-2018092402 A1 | * | 5/2018 | A63F 7/02 |
| WO | WO-2019159574 A1 | * | 8/2019 | A63F 7/027 |

OTHER PUBLICATIONS

The Written Opinion("WO") of PCT/JP2019/000596 dated Mar. 5, 2019.

\* cited by examiner

LIGHT GUIDE PLATE, LIGHT EMITTING DEVICE, DISPLAY DEVICE AND GAME MACHINE

FIELD

The present disclosure relates to a light guide plate, light emitting device, display device and game machine that present a stereoscopic image through parallax.

BACKGROUND

A known light emitting device may use a light guide plate to allow for a stereoscopic image to be presented based on parallax. As an example, Patent Document 1 discloses a light guide plate provided with a first reflection pattern that reflects light entering from a first light source at the side surface, and indicates that the light guide emits the reflection light from an emission surface. The emission surface includes a first point which emits first emission light toward one eye of an observer viewing said emission surface, and a second point which emits second emission light toward the other eye of the observer. A straight line passing through the first point and the center of the one eye, and a straight line passing through the second point and the center of the other eye intersect. A stereoscopic image may thus be presented via parallax.

RELATED ART DOCUMENTS

Patent Documents

[Patent Document 1] Japanese Patent Publication No. 2015-87769 (published May 7, 2015)

SUMMARY

Technical Problem

However, the light guide element and the light emitting device disclosed in Patent Document 1 can only present a stereoscopic image as a straight line traveling from the incidence surface which is at the light source toward the opposing surface facing the incidence surface.

With the forgoing problem in mind, embodiments herein aim to provide a light guide plate, light emitting device, display device and game machine that can achieve stereoscopic display of a curved line or angled line from the incidence surface for the light from the light source toward an opposing surface opposite said incidence surface.

Solution to Problem

A light guide plate according to an embodiment of the present invention is for presenting a stereoscopic image via parallax, the light guide plate including a plurality of deflectors arranged in rows parallel to an incidence surface through which light from a light source enters the light guide plate, the light totally reflecting inside the light guide plate while being guided therethrough, the plurality of deflectors including a reflection surface for reflecting and causing an emission surface to emit said light; and the reflection surfaces in a row of a plurality of deflectors all oriented in the same direction with the orientation of the reflection surfaces changing for each row in accordance with distance from the incidence surface.

Effects

Embodiments herein provide a light guide plate, light emitting device, display device and game machine that can achieve stereoscopic display of a curved line or angled line from the incidence surface for light from the light source toward an opposing surface opposite said incidence surface.

DETAILED DESCRIPTION

An embodiment (below, "the embodiment") according to one aspect herein is described below on the basis of the drawings.

Example Application

Figure 1:
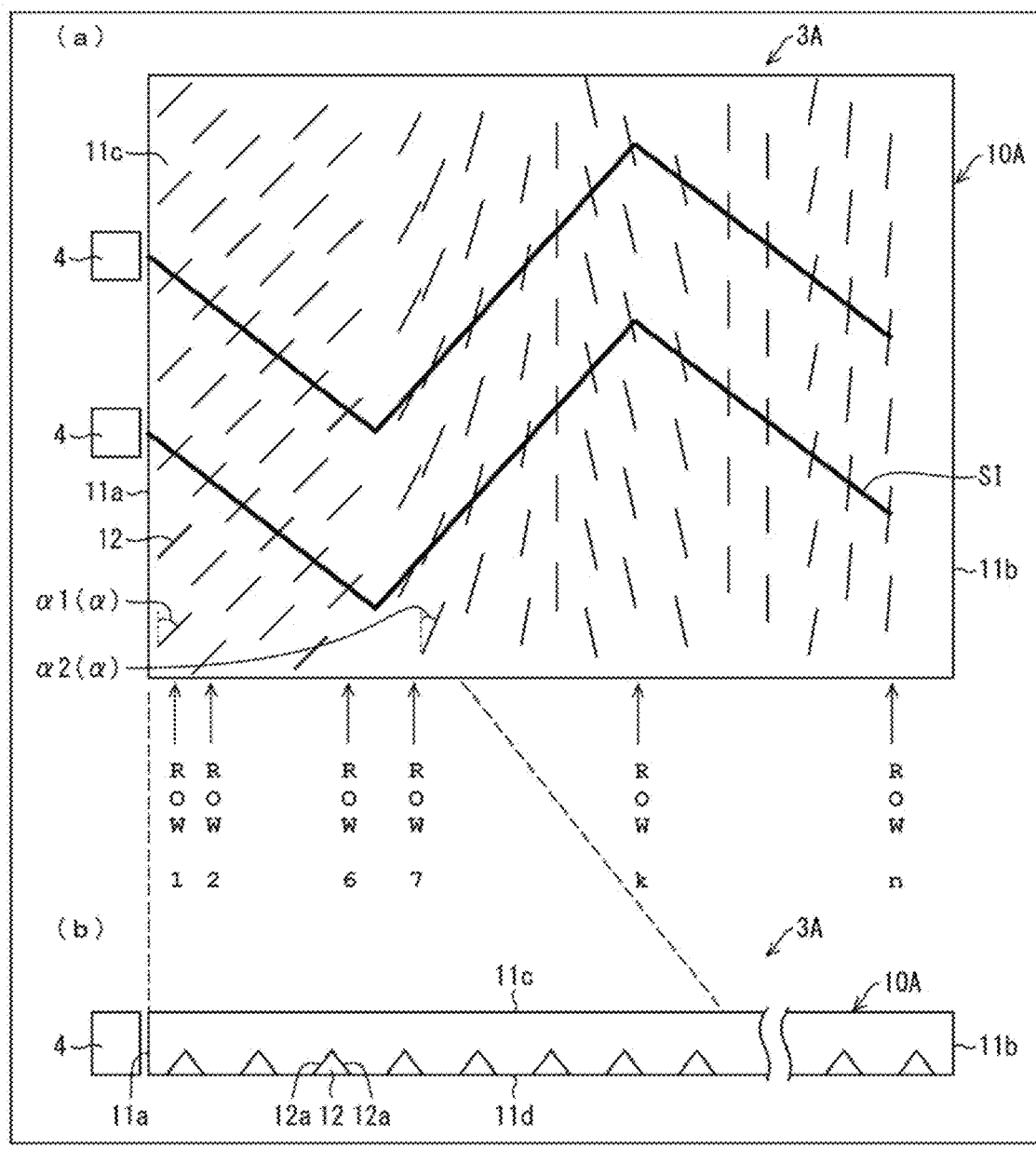
FIG. 1 is (a) a plan view illustrating a configuration of a light emitting device in a first embodiment and; (b) a cross-sectional view illustrating a configuration of said light emitting device.

First, an example of where the present invention may be applied is described on the basis of FIG. 1. FIG. 1 is (a) a plan view illustrating a configuration of a light emitting device 3A according to the first embodiment of the present invention; and (b) a cross-sectional view of the configuration of the light emitting device 3A.

As illustrated in FIG. 1, the light emitting device 3A herein is provided with a light guide plate 10A, and a plurality of light sources 4 arranged parallel to the side surface 11a of the light guide plate 10A. The side surface 11a serves as the incidence surface herein.

The light guide plate 10A presents a stereoscopic image SI by way of parallax. The light guide plate 10A includes a plurality of deflectors 12 arranged in rows that are parallel to the side surface 11a; the deflectors 12 include a slanted surface 12a; the slanted surfaces 12a reflect the light from the light source 4 entering via the side surface 11a and totally reflecting inside the light guide plate while being guided therethrough and causes said light to be emitted from the emission surface 11c. The slanted surfaces 12a in each row of the plurality of deflectors 12 are all oriented in the same direction and the orientation of the slanted surfaces 12a changes for each row in accordance with the distance from the side surface 11a. The slanted surface 12a functions as a reflection surface.

Thus, when presenting a stereoscopic image SI via parallax, it is possible to present curved or angled lines along the direction from the side surface 11a toward an opposing surface opposite said side surface 11a.

Therefore, it is possible to provide a light guide plate 10A and a light emitting device 3A that stereoscopically display curved and angled lines from the side surface 11a toward the side surface 11b that opposes said side surface 11a.

A display device 2 herein is provided with the light emitting device 3A and a game machine 1 herein is provided with the display device 2. Therefore, it is possible to provide a display device 2 and a game machine 1 equipped with a light guide plate 10A and a light emitting device 3A that stereoscopically display curved and angled lines from the side surface 11a toward the side surface 11b that opposes said side surface 11a.

Example Configuration

First Embodiment

Figure 2:
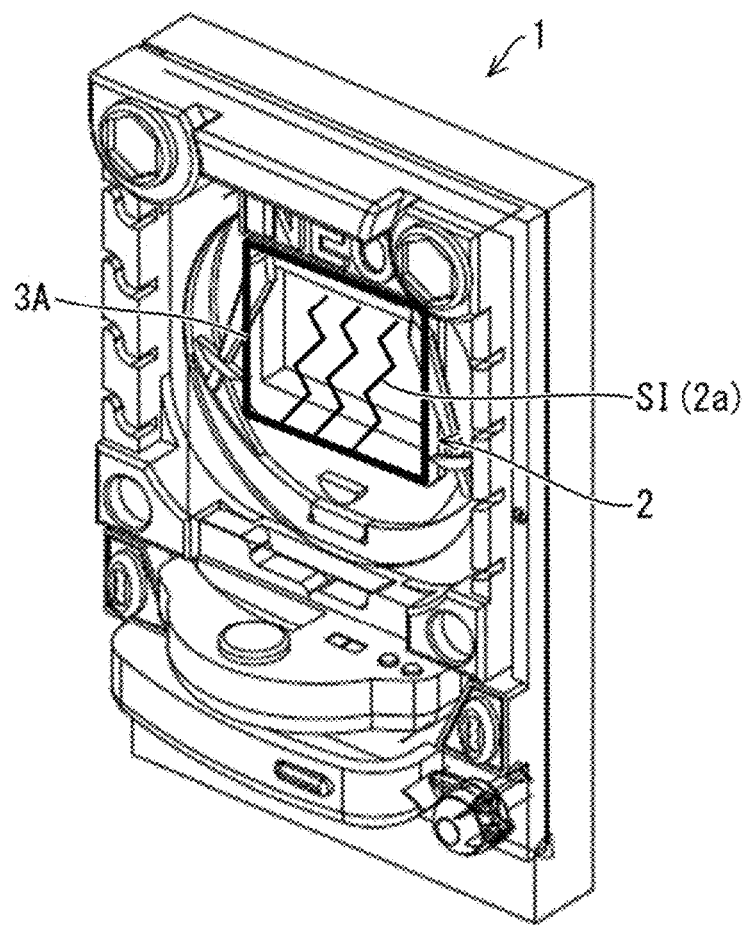
FIG. 2 is a perspective view illustrating a game machine and display device provided with said light emitting device.

The first embodiment herein is described below on the basis of FIG. 1 through FIG. 10B. The configuration of a game machine 1 provided with a light emitting device 3A according to this embodiment is described on the basis of FIG. 2. FIG. 2 is a perspective view illustrating a game machine 1 and display device 2 provided with the light emitting device 3A according to this embodiment.

As illustrated in FIG. 2, the display device 2 may be provided to, for instance, a pachinko machine or a slot machine which serve as the game machine 1. The display device 2 may contain a liquid crystal display device arranged near the center part of the game machine 1 and in this embodiment in particular, includes the light emitting device 3A which is equipped with the light guide plate 10A. The light emitting device 3A of this embodiment provides an image display 2a for each kind of presentation effect by presenting an effects image indicating a jackpot, an effects image indicating the anticipation of a jackpot, and the like. More specifically, the light emitting device 3A of this embodiment allows the stereoscopic image SI of a graphic or picture to be presented three dimensionally as the image display 2a on the display device 2. Note that controls, such as controlling whether or not to present the stereoscopic image SI, controlling the switching of the light source 4 causing the same to light at predetermined times, or controlling the switching of a plurality of light sources 4 which emit mutually different colors at predetermined times, may be performed by a controller (not shown) provided to the display device 2.

Configuration of the Light Emitting Device

The configuration of a light emitting device 3A of this embodiment is described on the basis of FIG. 1. FIG. 1 is (a) a plan view illustrating a configuration of the light emitting device 3A according to the embodiment; and (b) a cross-sectional view of the configuration of the light emitting device 3A.

As illustrated in FIG. 1, the light emitting device 3A is equipped with a plurality of light sources 4 and a light guide plate 10A.

The light sources 4 are light emitting elements that emit light toward the light guide plate 10A. The light source 4 is preferably a point light source, and for instance, a light emitting diode (LED) may be suitably used therefor. However, besides an LED, other types of light sources, such as a fluorescent lamp, may be used.

In this embodiment, a plurality of the light sources 4 is arranged along one side surface 11a which serves as the incidence surface of the light guide plate 10A. However, there may be a single light source 4 along the side surface 11a. The light source 4 may also be arranged at the side surface 11b that is opposite the side surface 11a.

The light guide plate 10A causes the light from the light source 4 that enters therein through the side surface 11a to totally reflect between the emission surface 11c and the lower surface 11d while guiding the light so the light is emitted from the emission surface 11c. The light guide plate 10A is a sheet-like cuboid component which is transparent and is produced from a material capable of totally reflecting light (e.g., an acrylic resin, or the like). However, the light guide plate 10A is not limited to a shape constituted by a plane of the cuboid; the shape of the light guide plate 10A may be constituted by a circular or polygonal plane, and the sheet may be flexible.

A plurality of deflectors 12 is formed on the lower surface 11d of the light guide plate 10A which faces the emission surface 11c; the deflectors 12 cause regular reflection of the light entering from the side surface 11a. The deflectors 12, which are in a plurality of rows aligned along the incidence direction of light, are V-shaped grooves that extend roughly orthogonally to said incidence direction. Note that for the sake of convenience, the number of deflectors 12 depicted in the drawings is less than the actual number of deflectors 12 formed on the light guide plate 10A.

The deflectors 12 include a slanted surface 12a which acts as a reflection surface that reflects the light from the light source 4 entering through the side surface 11a toward the emission surface 11c. In this embodiment the deflectors 12 include a slanted surface 12a corresponding to the side surface 11a for reflecting the light from the light source 4 entering through the side surface 11a. A slanted surface 12a may be formed corresponding to a light source 4 at the side surface 11b in cases where a light source 4 is also placed at the side surface 11b.

In order for an observer to perceive a stereoscopic image SI presented by the light emitting device 3A of the embodiment as three dimensional, the angle of the slanted surface 12a on the deflectors 12 in the light emitting device 3A is adjusted so that light of a predetermined directionality is emitted from a predetermined point on the emission surface 11c. The directionality of the light emitted from the deflectors 12 and the emission surface 11c is described later.

Figure 3:
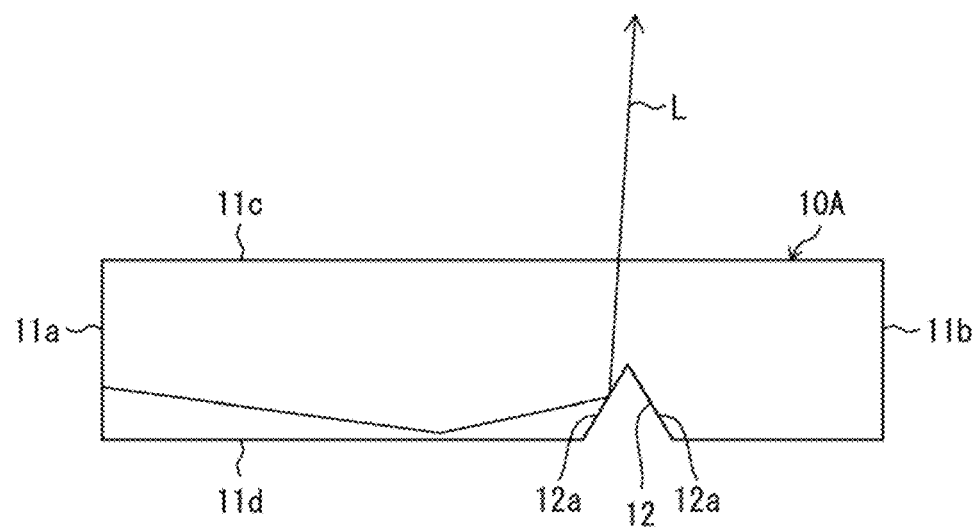
FIG. 3 is a cross-sectional view illustrating a path of light guided by a light guide plate provided to said light emitting device.

Next, the deflectors 12 are described in detail on the basis of FIG. 3 and FIG. 4A through FIG. 4D. FIG. 3 is a cross-sectional view illustrating a path of light guided by a light guide plate 10A provided to said light emitting device 3A; FIG. 3 depicts a case where the deflectors 12 reflect light entering through the side surface 11a. FIG. 4A through FIG. 4D are cross-sectional views each illustrating an example of the shape of a deflector 12 that may be formed on the light guide plate 10A; The upper part of FIG. 4A through 4D is the plan view and the lower part is the cross-sectional view of the deflector 12.

As illustrated in FIG. 3, the slanted surface 12a of the deflector 12 causes regular reflection of the light from the light source 4 entering through the side surface 11a toward the emission surface 11c. The light regularly reflected by the slanted surface 12a is emitted from the emission surface 11c as emission light L with a strong directionality.

Figure 4A:
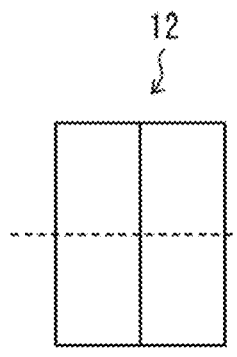
FIG. 4A through FIG. 4D are cross-sectional views each illustrating an example of the shape of a deflector that may be formed on said light guide plate.

As illustrated in FIG. 4A, the deflectors 12 in this embodiment are shaped to include a slanted surface 12a for reflecting the light from the light source 4 entering through the side surface 11a. However, the cross-sectional shape of the deflector 12 and the orientation of the slanted surface 12a may be modified as appropriate in accordance with the placement of the light source 4, the type of stereoscopic image SI to be presented, and the observation point (i.e., the distance and angle of an observer relative to the emission surface 11c).

Figure 4B:

FIG. 4A considers a case where a light source 4 is placed at both ends of the light guide plate 10A at side surfaces 11a, 11b, and the deflectors 12 include slanted surfaces 12a, 12a on both sides to correspond to side surfaces 11a, 11b respectively. However, if, for instance, a light source 4 is placed on only one side of the light guide plate 10A at the side surface 11a, then as illustrated in FIG. 4B, the cross-sectional shape of the deflectors 12 may be such that the slanted surface 12a is only toward the side surface 11a.

Figure 4C:
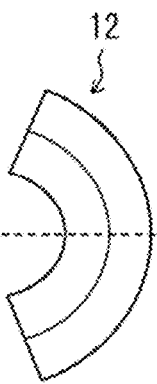

As illustrated in FIG. 4C, the deflectors 12 are not limited to a linear shape, and may be curved. Hereby, various stereoscopic images SI can be presented.

Figure 4D:
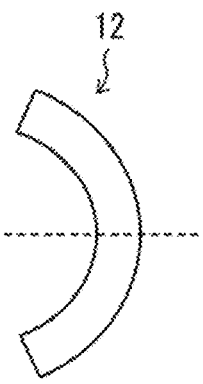
Figure 4D:
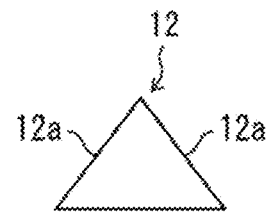
Figure 4D:
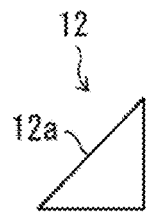
Figure 4D:
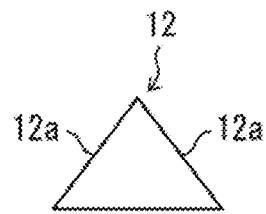
Figure 4D:
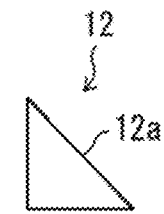

Moreover, if the light source 4 is placed on only one side of the light guide plate 10A at side surface 11b as illustrated in FIG. 4D, as illustrated in FIG. 4D, the cross-sectional shape of the deflectors 12 may include the slanted surface 12a only toward the side surface 11b.

The gap between adjacent deflectors 12 is preferably such that the formation of the deflectors 12 is indistinguishable to the human eye, and may be, roughly 300 μm. If the gap between the deflectors 12 is too wide, the stereoscopic image SI presented appears segmented and tends to make it difficult for the observer to perceive depth to the stereoscopic image SI.

While in this embodiment the deflectors 12 are produced from cutting recessed parts (grooves) into the lower surface 11d of the light guide plate 10A, the makeup of the deflectors 12 is not limited thereto. The deflectors 12 may be projections that protrude from the lower surface 11d of the light guide plate 10A. Alternatively, the deflectors 12 may be formed from another reflector component.

Figure 5:
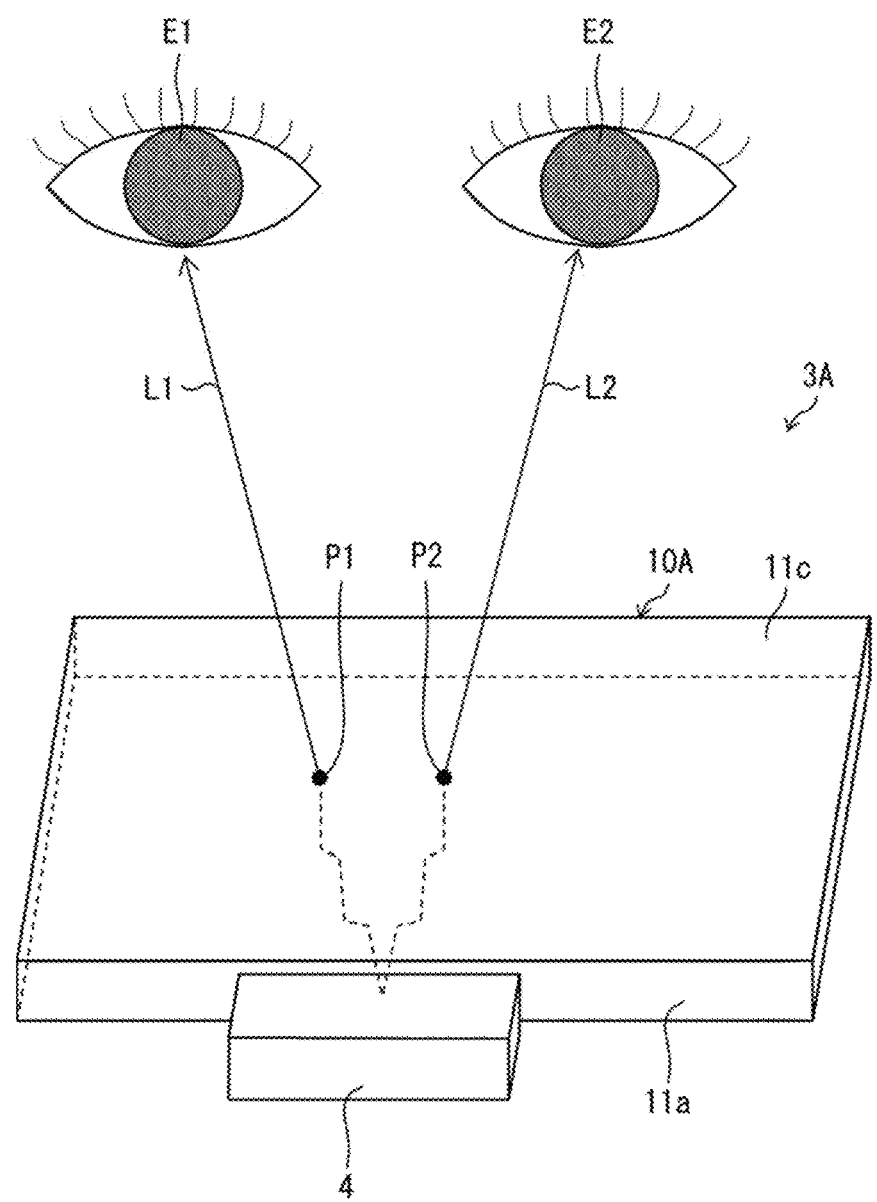
FIG. 5 is a perspective view for describing the directionality of the emission light exiting from the emission surface of the light guide plate in the light emitting device.
Figure 6:
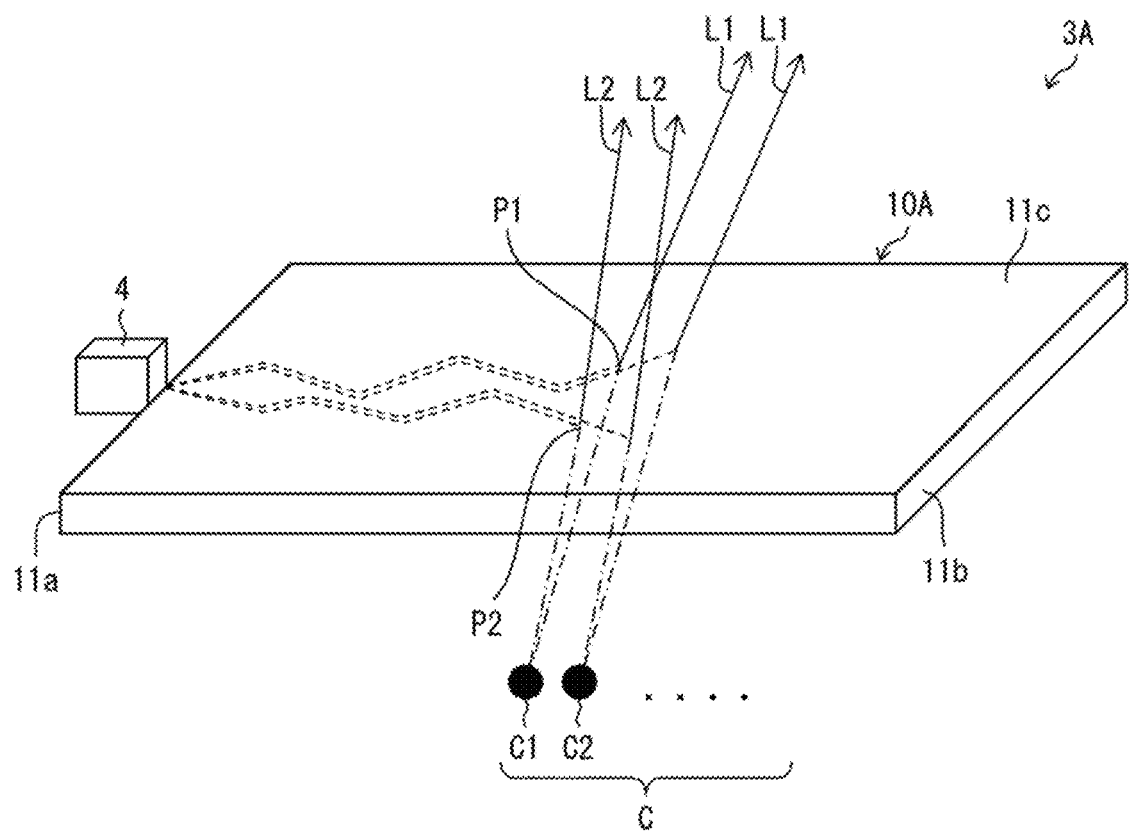
FIG. 6 is for illustrating the principle of parallax-based stereoscopic display in the light emitting device and is a perspective view of a plurality of intersection points where a straight line passing through a first point and the center of one eye of an observer, and a straight line passing through a second point and the other eye of the observer intersect.
Figure 18A:
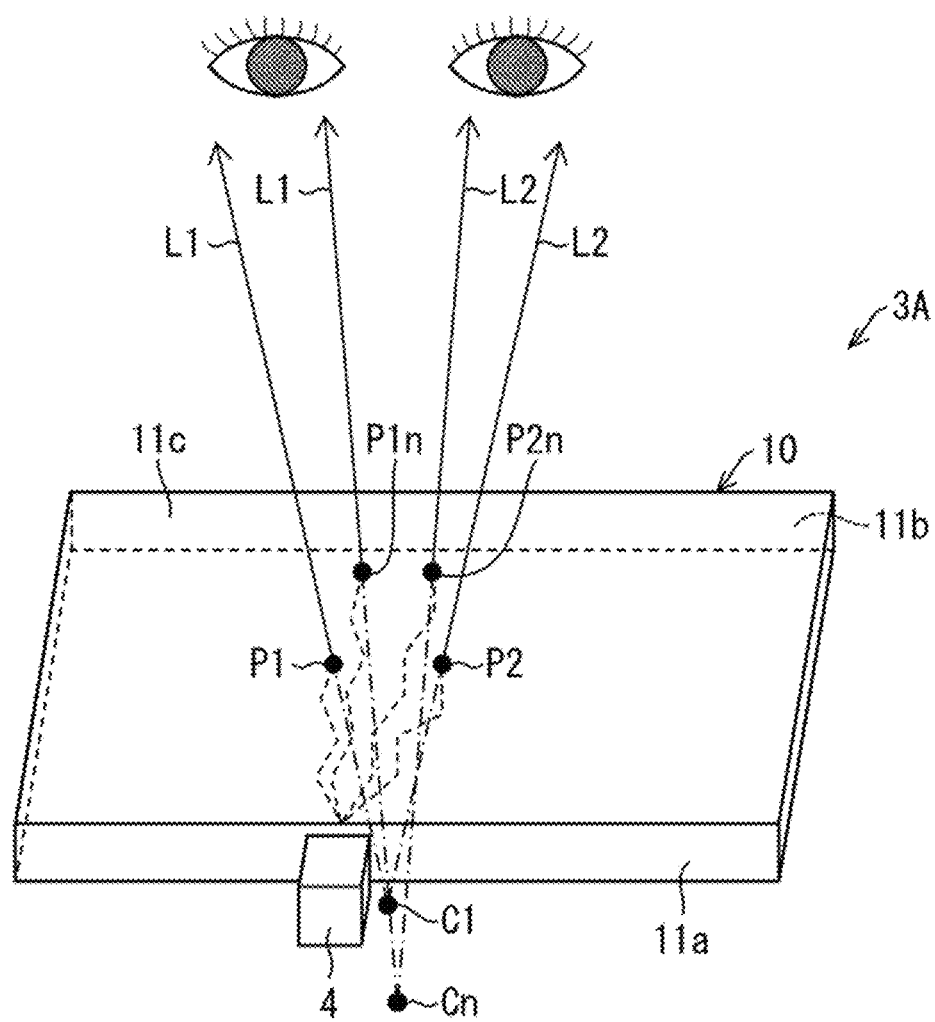
FIG. 18A is a perspective view illustrating the directionality of emission light emitted from the emission surface of the light guide plate in a light emitting device of a reference embodiment.
Figure 18B:
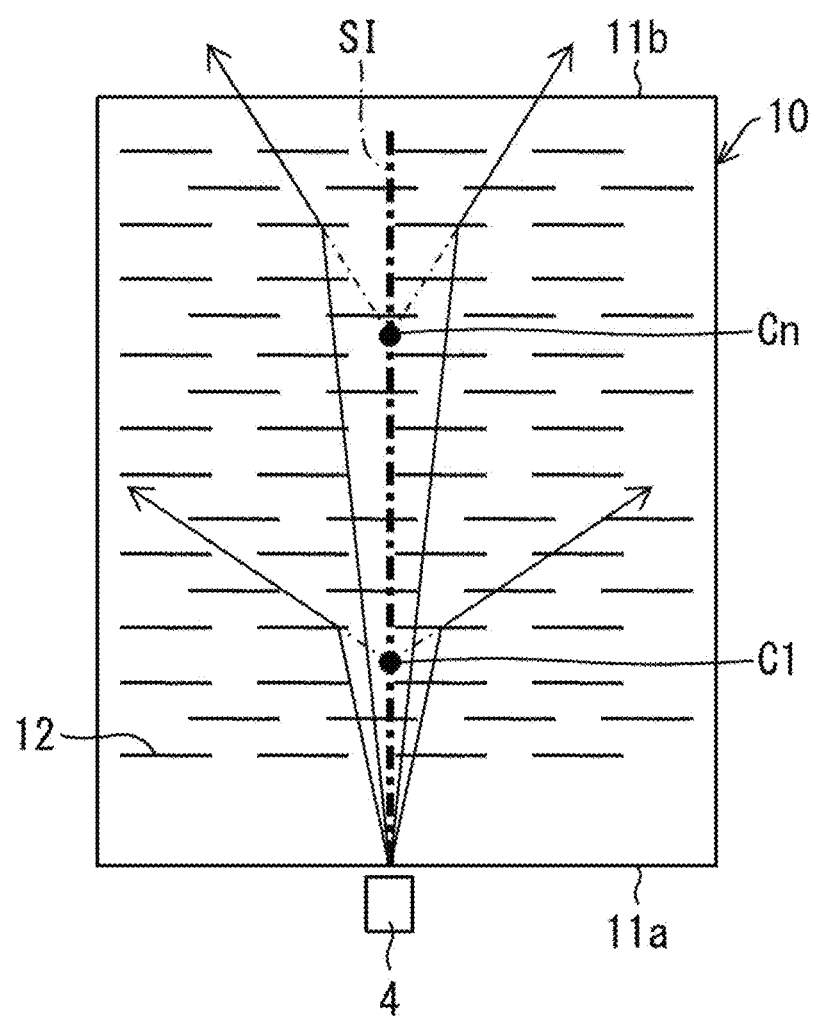
FIG. 18B is a plan view illustrating that a stereoscopic image made up of straight lines is presented when the orientation of the deflectors is parallel to the incidence surface while also illustrating that the amount of light from the left and right sides of the light guide plate decreases with distance from the incidence surface in the light guide plate of the light emitting device of the reference embodiment.
Figure 18C:
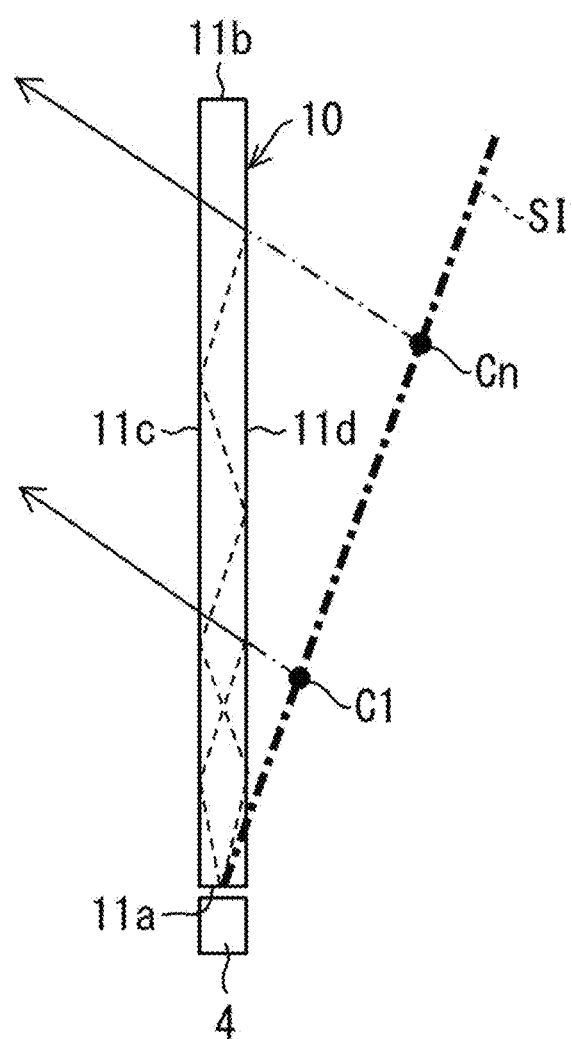
FIG. 18C is a cross-sectional view illustrating a position in the depth direction that the stereoscopic image may be seen in the light emitting device of the reference embodiment.
Figure 19:
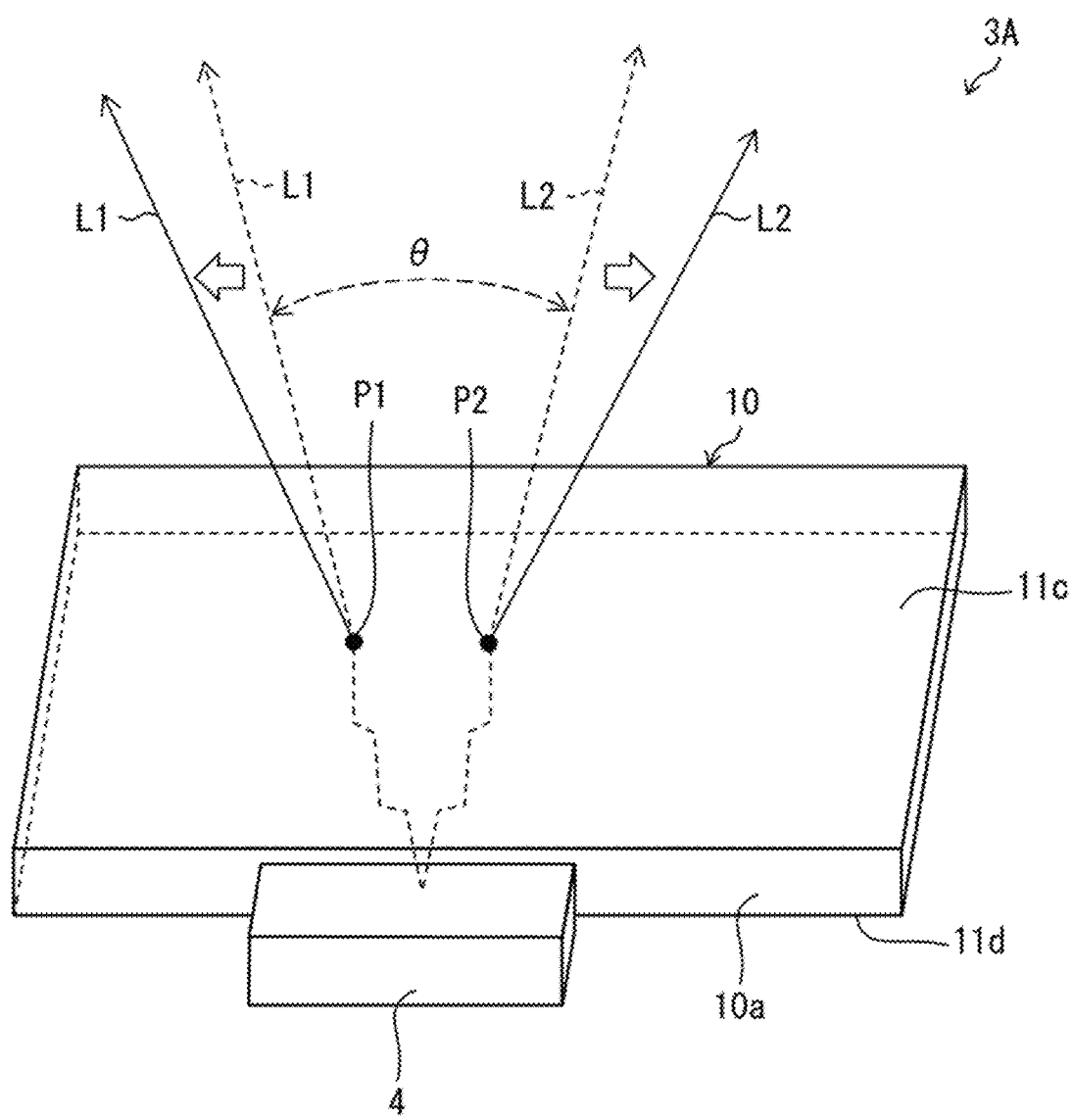
FIG. 19 is a perspective view for describing the relationship between the emission angle of emission light used for parallax-based stereoscopic display and the sense of depth from the light emitting device of the reference embodiment.

Principles of Parallax-Based Stereoscopic Display Using Light Emitted from the Emission Surface Next, the principles with regard to the directionality of light emitted from the emission surface 11c of the light guide plate 10A and of stereoscopic display are described on the basis of FIG. 5, FIG. 6, and FIG. 18A, FIG. 18B, FIG. 18C and FIG. 19. FIG. 5 is a perspective view for describing the directionality of the emission light emitted from the emission surface 11c of the light guide plate 10A in the light emitting device 3A; FIG. 6 is for illustrating the principle of parallax-based stereoscopic display in the light emitting device 3A and is a perspective view of intersection points where a straight line passing through a first point and the center of one eye of an observer, and a straight line passing through a second point and the center of the other eye of the observer intersect; FIG. 18A is a perspective view illustrating an example of the state of emission light in a light emitting device of a reference embodiment; FIG. 18B is a plan view illustrating the orientation of the deflectors in the light emitting device of the reference embodiment and a stereoscopic image made up of straight lines; FIG. 18C is a cross-sectional view illustrating the depth of a stereoscopic image in the light emitting device of the reference embodiment; and FIG. 19 is a perspective view illustrating an example of a parallax-based stereoscopic display from the light emitting device of the reference embodiment.

As illustrated in FIG. 5, a first emission light L1 that is emitted from a first point P1 on the emission surface 11c of the light guide plate 10A is emitted in an angular range to illumine one eye E1 of an observer positioned at a predetermined observation point and the vicinity thereof. Meanwhile, a second emission light L2 that is emitted from a second point P2 on the emission surface 11c is emitted in an angular range to illumine the other eye E2 of the same observer and the vicinity thereof.

That is, while the first emission light L1 emitted from the first point P1 is perceived at the one eye E1 of the observer, either the first emission light L1 is not perceived at the other eye E2 or the amount of light perceived at the other eye E2 is extremely small compared to the amount of light perceived at the one eye E1. The first emission light L1 therefore has directionality.

Meanwhile, while the second emission light L2 emitted from the second point P2 is perceived at the other eye E2 of the observer, either the second emission light L2 is not perceived at the one eye E1 or the amount of light perceived at the one eye E1 is extremely small compared to the amount of light perceived at the other eye E2. The second emission light L2 therefore has directionality.

Note that the angular range (directionality) of the first emission light L1 emitted from the first point P1 and the angular range (directionality) of the second emission light L2 emitted from the second point P2 may be established as appropriate on the basis of the distance and angle of an observer at an observation point relative to the emission surface 11c.

Next, as illustrated in FIG. 6, a line passing through the first point P1 and the center of the one eye E1, i.e., the pupil or the lens, and a line passing through the second point P2 and the center of the other eye E2 intersect at an intersection point C. In other words, intersection point C is the intersection of the optical axes of the first emission light L1 emitted from the first point P1 and perceived by the one eye E1 of the observer, and the second emission light L2 emitted from the second point P2 and perceived by the other eye E2 of the observer. Therefore, that the emission point appears to the observer to exist at the intersection point C is an optical illusion.

If the intersection point C is located on the observer side relative to the emission surface 11c, to the observer the emission point appears to be protruding from the emission surface 11c. Whereas, if the intersection point C is located on the opposite side of the emission surface 11c from the observer, to the observer the emission point appears behind the emission surface 11c. In this embodiment, the intersection point C gives the observer a sense of depth because, for instance, the intersection point C is located below the lower surface 11d which is located on the opposite side of the emission surface 11c from the observer.

Thus, the first emission light L1 is emitted in an angular range toward the one eye E1 of the observer and the vicinity thereof and the second emission light L2 is emitted in an angular range toward the other eye E2 of the same observer and in the vicinity thereof, and if the optical axes of the first emission light L1 and the second emission light L2 intersect at an intersection point C, the emission point appears to exist at the intersection point C for the observer. Therefore, forming a plurality of such kind of intersection point C as a collection of consecutive points intersection points C1, C2, . . . thereby allows an observer to perceive a solid stereoscopic image SI that is, for instance, a straight line.

More specifically, as illustrate in FIG. 18A and FIG. 18B, light appears to collect at the intersection point C1 due to the plurality of deflectors 12 in the row closest and parallel to the side surface 11a which is the incidence surface for light entering from the light source 4. Light also appears to collect at the intersection point C2 due to the plurality of deflectors 12 in the next row that is parallel to the side surface 11a which is the incidence surface for light entering from the light source 4. Hereafter, this process is repeated up to an intersection point Cn due to the plurality of deflectors 12 furthest from the side surface 11a to thereby create the intersection points C1-Cn whereby the series of intersection points C1-Cn create a straight line that can be seen as a solid stereoscopic image SI.

At this point it is possible to design the sense of depth of the stereoscopic image SI that is displayed, that is, how far away the intersection point C is located from the lower surface 11d of the light guide plate 10A, by using the deflectors 12 to change the angle of reflection. More specifically, as illustrated in FIG. 19, the larger the angle θ created between a line through the first point P1 and the center of the one eye E1 and a line through the second point P2 and the center of the other eye E2 the shallower the sense of depth in the stereoscopic image SI presented. That is, the location of the intersection point C approaches the lower surface 11d. The stereoscopic image SI may be presented with a [greater] sense of depth by simply changing the reflection angle from the corresponding deflector 12 to reduce the angle θ. It is thus possible to adjust the inclination of the slanted surface 12a of the deflector 12 to adjust the sense of depth of the stereoscopic image SI being presented.

The inclination of the slanted surface 12a on the plurality of deflectors 12, which equidistant from the side surface 11a at which the light source 4 is located is constant. Therefore, as illustrated in FIG. 18B, the angle created between the direction light from the light source 4 is reflected and the normal direction to the light guide plate 10 increases with distance of the placement location of the deflector 12 from the optical axis of light from the light source 4. Further, for the deflectors 12 positioned at the same distance from the light source 4, the closer the deflector 12 is to the side surface 11a, the greater the angle created between the direction light from the light source 4 is reflected and the normal direction of the light guide plate 10.

The light entering the left and right eye of the observer create a large angle with the normal direction of the light guide plate 10 from the deflectors 12 located close to the side surface 11a and create a small angle with the normal direction of the light guide plate 10 from the deflectors 12 located away from the side surface 11a. When the light entering the left and right eyes of the observer create a large angle with the normal direction of the light guide plate 10, the intersection point C1, which is the image forming location, appears to exist close to the lower surface 11d of the light guide plate 10A as illustrated in FIG. 18C. Meanwhile, when the light entering the left and right eyes of the observer create a small angle with the normal direction of the light guide plate 10, the intersection point Cn, which is the image forming location, appears to exist away from the lower surface 11d of the light guide plate 10A as illustrated in FIG. 18C.

Configuration for Stereoscopic Display of Curved and Angled Lines

Figure 7:
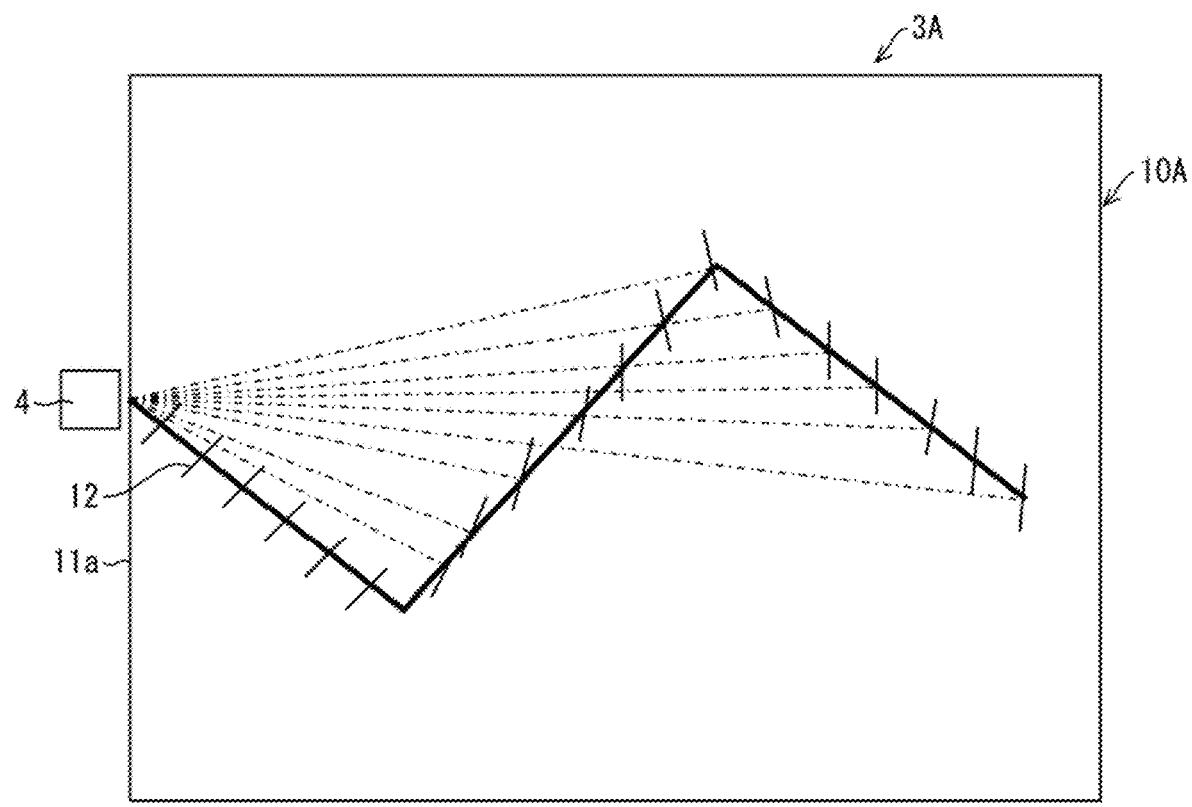
FIG. 7 is a plan view for illustrating the change in orientation for only the deflectors in the light guide plate related to presenting a single angled line when an angled line is presented via stereoscopic display.
Figure 8:
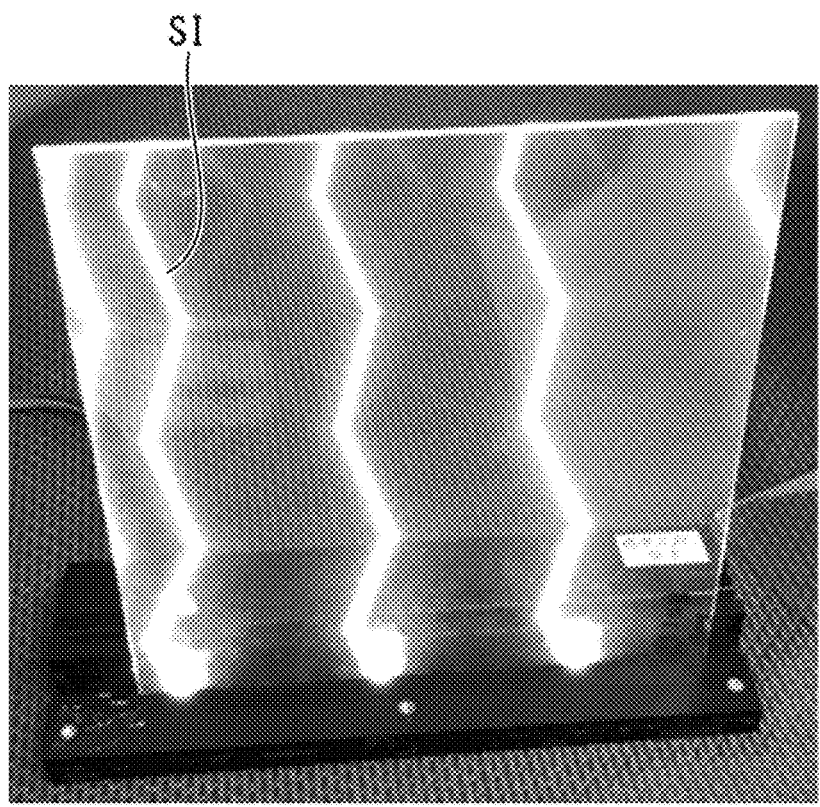
FIG. 8 is a perspective view illustrating zigzag angled line as an example of a parallax-based stereoscopic display in the light emitting device.
Figure 20:
FIG. 20 is a plan view illustrating an example of a parallax-based stereoscopic display from the light emitting device of the reference embodiment.

A configuration for stereoscopic display of curved or angled lines via the light guide plate 10A and the light emitting device 3A of this embodiment is described on the basis of FIG. 1, FIG. 7, FIG. 8, and FIG. 20. FIG. 7 is a plan view for illustrating the change in orientation with regard to only the deflector 12 in relationship with a single angled line in the light guide plate 10A when an angled line is presented via stereoscopic display; FIG. 8 is a perspective view illustrating a zigzag angled line as an example of a parallax-based stereoscopic display in the light emitting device 3A; and FIG. 20 is a plan view illustrating an example of a parallax-based stereoscopic display from the light emitting device of the reference embodiment.

As previously described with regard to FIG. 18B, the orientation of the reflection surface on the plurality of deflectors 12 is the same even then the linear distance from the side surface 11a changes. That is, the orientation of all the plurality of deflectors 12 is parallel to the side surface 11a. As a result, the solid shape of the stereoscopic image SI presented is a straight line oriented from the side surface 11a to the side surface 11b. More specifically, as illustrated in FIG. 20, the line of light extending vertically in FIG. 19 is presented stereoscopically. Note that the plurality of lines of light extending from left to right in FIG. 20 are presented stereoscopically, and the plurality of lines of light correspond to the number of light sources 4 placed at the side surface 11a.

However, a stereoscopic image SI of a simple line is of little interest. Therefore, as illustrated in FIG. 1, the light guide plate 10A in the light emitting device 3A of the embodiment is provided with a plurality of deflectors 12 arranged in rows that are parallel to the side surface 11b with each of the deflectors 12 including a slanted surface 12a that acts as a reflection surface. The slanted surfaces 12a reflect light from the light source 4 entering via the side surface 11a as the incidence surface and totally reflecting inside the light guide plate while being guided therethrough and cause said light to be emitted from the emission surface 11c. The slanted surfaces 12a in each row of deflectors 12 are all oriented in the same direction and the orientation of the slanted surfaces 12a changes with distance from the side surface 11b. The gap between rows does not need to be equal, and further, the deflectors 12 do not each need to be aligned along a straight line perpendicular to a certain point on the side surface 11a.

More specifically, an angle α relative to the side surface 11b, which is the orientation of the slanted surfaces 12a on the plurality of deflectors 12 that are arranged in rows changes discretely in accordance with the distance from the side surface 11b in the light guide plate 10A of the embodiment. In FIG. 1 for instance, a first angle α which is the angle α relative to the side surface 11b and is the orientation of each of the slanted surfaces 12a of the deflectors 12, may be substantially the same from the first through sixth rows, or may change gradually while at the seventh row the angle α relative to the side surface 11b is suddenly a different second angle α that is different from the first angle α. The first angle α is continuously almost the same or gradually changes from the first through sixth rows, while between the sixth and seventh row, the angle suddenly changes from a first angle α which is the orientation of the slanted surfaces 12a of the deflectors 12 in the sixth row to a second angle α which is the orientation of the slanted surfaces 12a of the deflectors 12 in the seventh row and beyond; in other words, the change is discontinuous between the six and seventh rows.

As illustrated in FIG. 7, the slanted surfaces 12a in the deflectors 12 that are on the angled line of the stereoscopic image SI are oriented toward the location of the light source 4. More specifically, the deflectors appear that way due to parallax.

Arranging the deflectors 12 of the light guide plate 10A allows a stereoscopic image SI of an angled line, like a zig zag line, to be presented as illustrated in FIG. 8. The individual stereoscopic images SI from the slanted surfaces 12a of the deflectors 12 appear at an image forming location that is perpendicular to the slanted surfaces 12a.

Figure 9A:
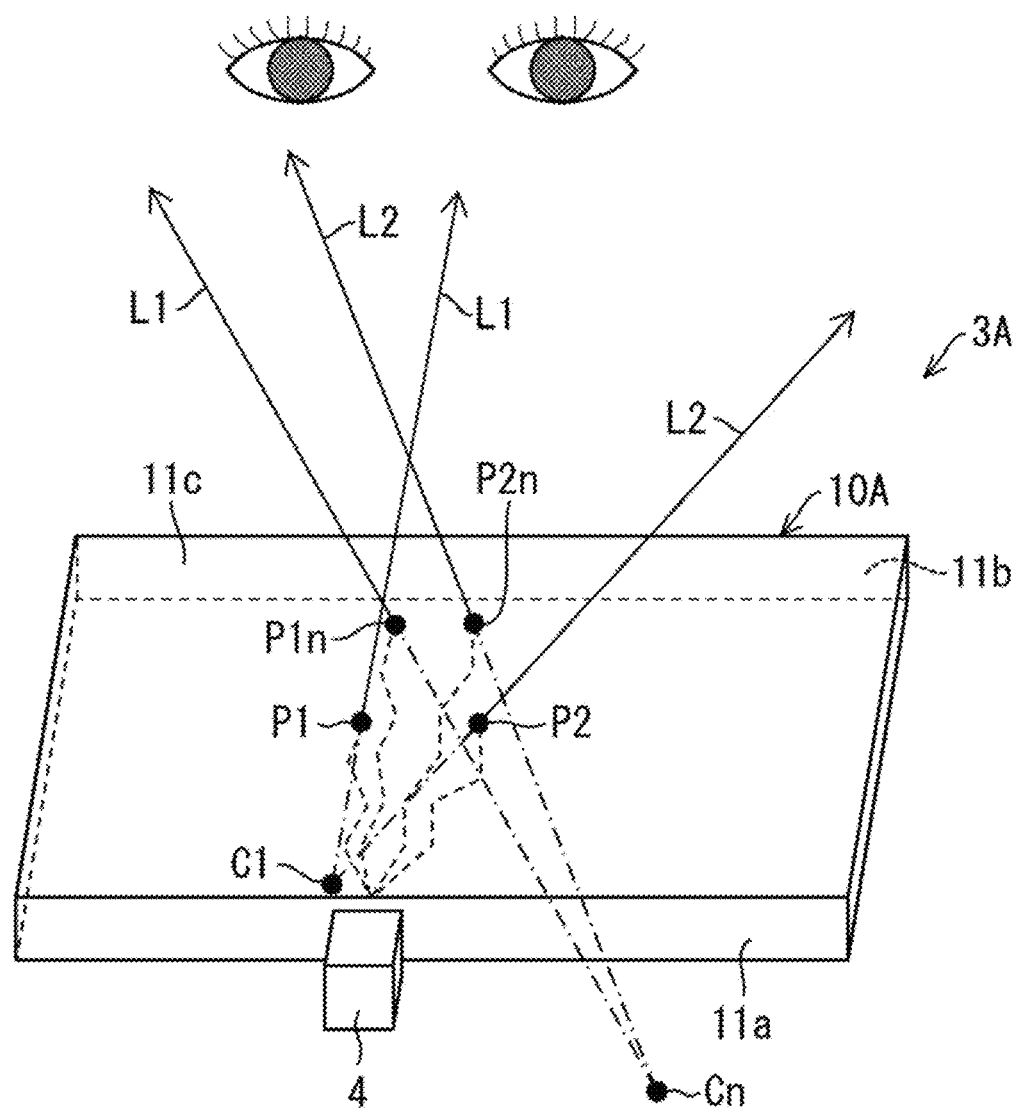
FIG. 9A is a perspective view illustrating the change in directionality of emission light emitted from the emission surface when the orientation of the deflectors change in the light guide plate in the light emitting device.
Figure 9B:
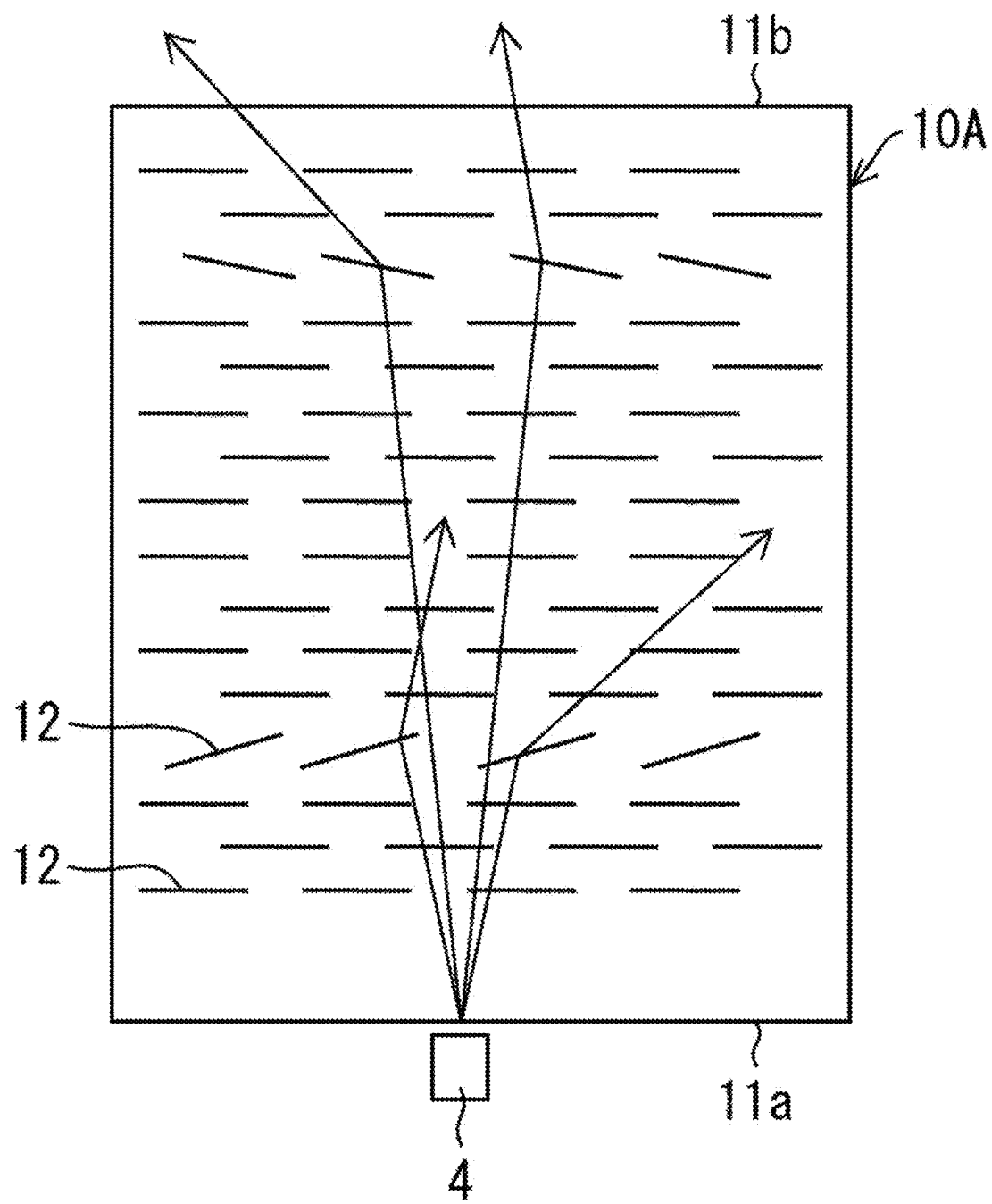
FIG. 9B is the plan view.
Figure 9C:
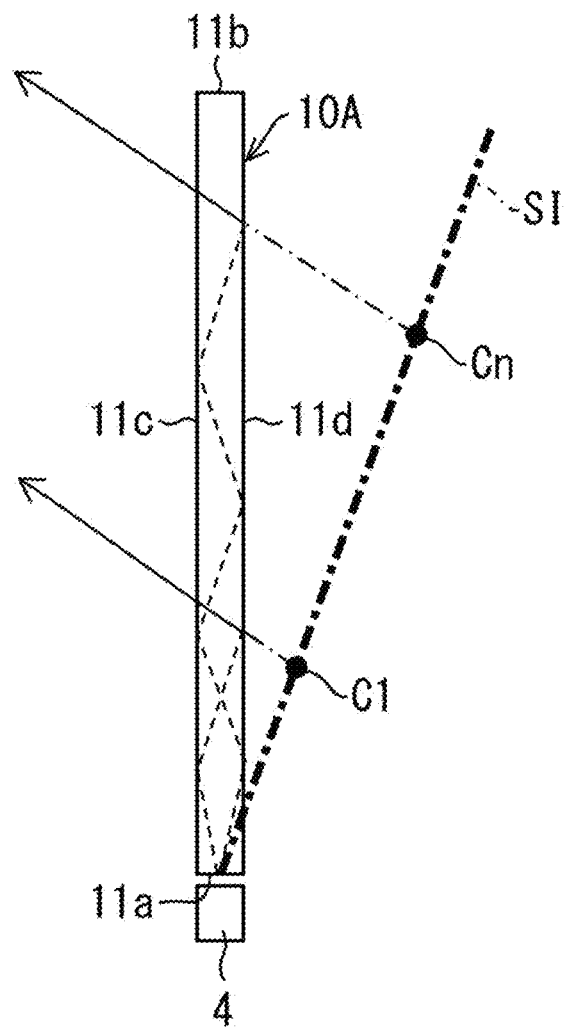
FIG. 9C is a cross-sectional view illustrating a position in the depth direction at which a stereoscopic image can be seen in the light emitting device.

The change in directionality of emission light emitted from the emission surface 11c when the orientation of the deflectors 12 changes is described on the basis of FIGS. 9A, 9B, and 9C. FIG. 9A is a perspective view illustrating the change in directionality of emission light emitted from the emission surface 11c when the orientation of the deflectors 12 changes in the light guide plate 10A in the light emitting device 3A; FIG. 9B is a plan view illustrating the change in directionality of emission light emitted from the emission surface 11c when the orientation of the deflectors 12 changes in the light guide plate 10A in the light emitting device 3A; and FIG. 9C is a cross-sectional view illustrating a position in the depth direction at which a stereoscopic image SI can be seen in the light emitting device 3A.

As illustrated in the aforementioned FIG. 18B, the stereoscopic image SI presented is perpendicular to the side surface 11b when the deflectors 12 are oriented parallel to the side surface 11b. However, as illustrated in FIGS. 9A, 9B, and 9C, when the deflectors 12 are not parallel to the side surface 11b, light is emitted from the points P1 and P2 which in contrast are shifted laterally instead of being along a straight line, and the points P1n and P2n; as a result, the stereoscopic image SI appears to come from the point C1 and the point Cn. Thus, the intersection position changes along the horizontal direction, that is, along a direction parallel to the side surface 11b in accordance with the orientation of the deflectors 12. Hence, it is thus possible to present the stereoscopic image SI of a line as a curve.

Thus, a method of presenting an angled line such as a zig zag line as the stereoscopic image SI has been described. However, the light emitting device 3A of the embodiment is capable of presenting not only an angled line but also a curved line as a stereoscopic image SI.

Figure 10A:
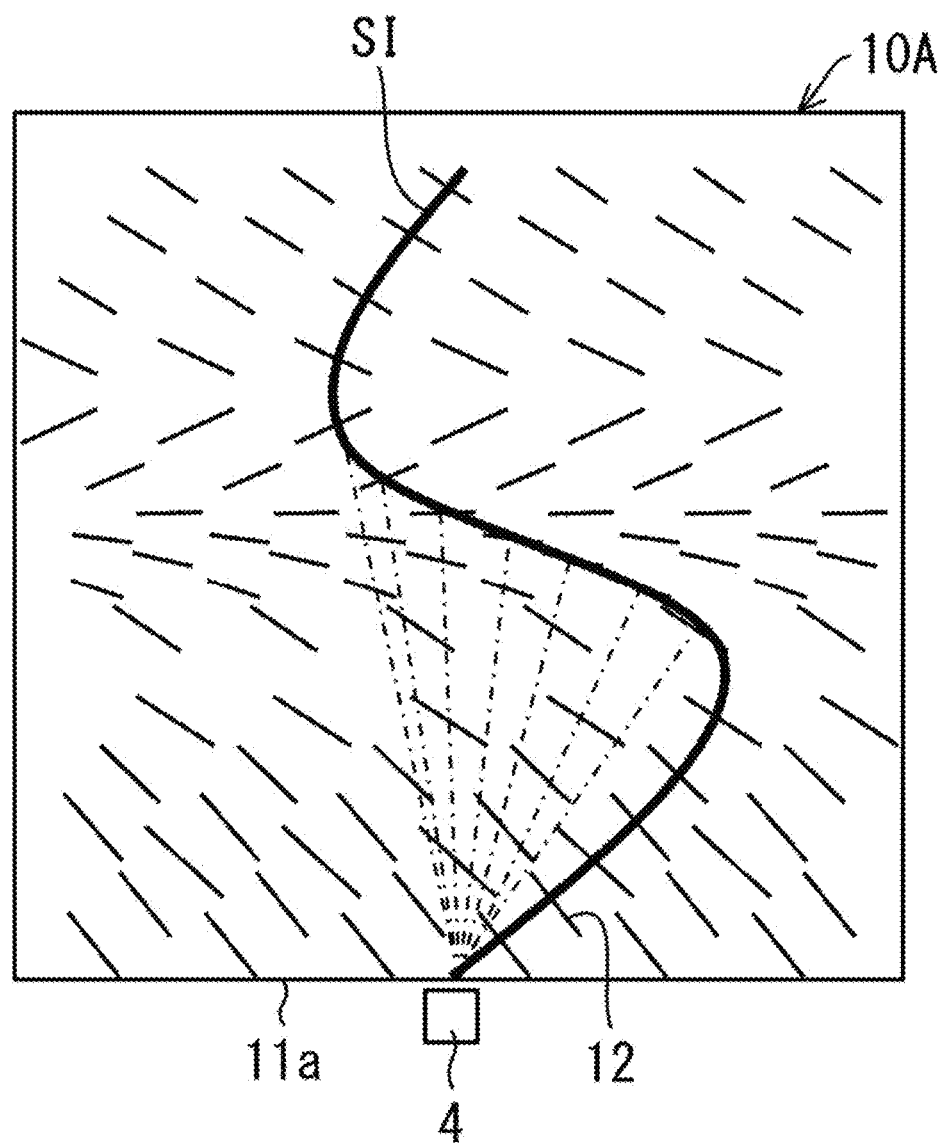
FIG. 10A is a plan view illustrating the change in orientation for all the deflectors in the light guide plate when the light emitting device causes stereoscopic display of the curve of the letter S.
Figure 10B:
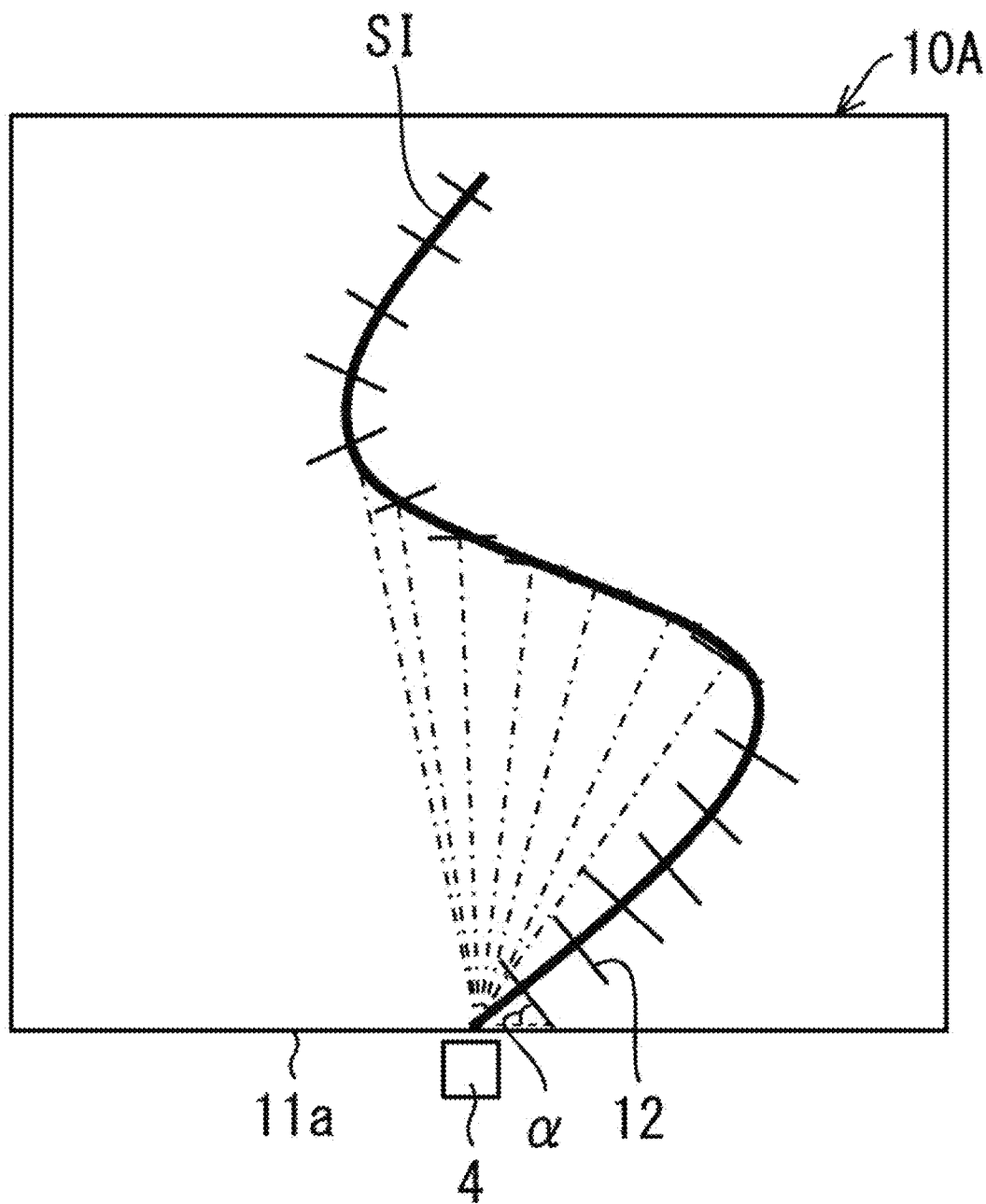
FIG. 10B is a plan view of the change in orientation with regard to only the deflectors related to presenting the letter S in the light guide plate when the light emitting device causes stereoscopic display of the curved line of the letter S.

A method of presenting a stereoscopic image SI of a curved line is described on the basis of FIGS. 10A and 10B. What follows is a method for presenting the stereoscopic image SI of the letter S as a curved line. FIG. 10A is a plan view illustrating the change in orientation for all the deflectors 12 in the light guide plate 10A when the light emitting device 3A causes stereoscopic display of the curve of the letter S; and FIG. 10B is a plan view of the change in orientation with regard to only the deflectors 12 related to presenting the letter S in the light guide plate 10A.

As illustrated in FIGS. 10A and 10B, when presenting the curve of the letter S stereoscopically, the angle α relative to side surface 11a, which is the orientation of the slanted surfaces 12a in the plurality of deflectors 12 in a row changes by increasing or decreasing continuously and consecutively with distance to the side surface 11a. It is thus possible to provide a light guide plate 10A capable of actual stereoscopic display of a curved line traveling from the side surface 11a to the side surface 11b opposite said side surface 11a with the light from the light source 4.

That is, in the embodiment the stereoscopic image SI is a curve when the orientation of the deflectors 12 changes continuously in a direction orthogonal to the direction from the side surface 11a to the side surface 11b. In contrast, the stereoscopic image SI is an angled line when the orientation of the deflectors 12 change discretely in a direction orthogonal to the direction from the side surface 11a to the side surface 11b.

As illustrated in FIGS. 10A and 10B, the slanted surfaces 12a in the deflectors 12 that are on the curve line of the stereoscopic image SI are oriented toward the location of the light source 4. More specifically, the deflectors appear that way due to parallax.

As above described, the light emitting device 3A of the embodiment is equipped with a light guide plate 10A, and a plurality of light sources 4 arranged parallel to the side surface 11a of the light guide plate 10A. The light guide plate 10A presents a stereoscopic image SI by way of parallax. The light guide plate 10A includes a plurality of deflectors 12 arranged in rows parallel to the side surface 11a, and the deflectors 12 include a slanted surface 12a which reflects the light from the light source 4 entering via the side surface 11a as an incidence surface and totally reflecting inside the light guide plate while being guided therethrough, the slanted surface 12a causing said light to be emitted from the emission surface 11c. The slanted surfaces 12a in each row of the plurality of deflectors 12 are all oriented in the same direction and the orientation of the slanted surfaces 12a changes for each row in accordance with the distance from the side surface 11a.

Thus, when presenting a stereoscopic image SI via parallax, it is possible to present curved or angled lines along the direction from the side surface 11a toward an opposing surface opposite said side surface 11a.

Therefore, it is possible to provide a light guide plate 10A and a light emitting device 3A that stereoscopically display curved and angled lines from the side surface 11a toward the side surface 11b that opposes said side surface 11a.

The angle α relative to side surface 11a, which is the orientation of the slanted surfaces 12a in the plurality of deflectors 12 in a row changes by increasing or decreasing continuously and consecutively with distance to the side surface 11a in the light guide plate 10A of the embodiment.

It is thus possible to provide a light guide plate 10A capable of actual stereoscopic display of a curved line traveling from the side surface 11a to the side surface 11b opposite said side surface 11a with the light from the light source 4.

An angle α relative to the side surface 11a, which is the orientation of the slanted surfaces 12a on the plurality of deflectors 12 that are arranged in rows may change discretely in accordance with the distance from the side surface 11a in the light guide plate 10A of the embodiment.

Hereby, if the orientation of the slanted surfaces 12a for the plurality of deflectors 12 keeps the imaging forming location of the stereoscopic image SI the same continuously over a plurality of rows from the side surface 11a toward the side surface 11b, then it is possible to present a stereoscopic image SI of a straight line. Further, an angle α relative to the side surface 11a, that is, the orientation of the slanted surfaces 12a of the plurality of deflectors 12 for each row may be changed in accordance with the distance from the side surface 11a to increase or decrease discretely; and when the angle α is the same continuously over several rows, the aforementioned straight line suddenly changes direction and causes a stereoscopic image SI of a straight line to be presented. It is thus possible to present a stereoscopic image SI of an angled line such as a zigzag line.

The display device 2 according to the embodiment is provided with the light emitting device 3A and a controller that controls at least one of the emission time of a light source 4 in the light emitting device 3A and the switching between a plurality of light sources 4 that emit mutually different colors. Hereby, the display device 2 can provide effects by abruptly presenting curved lines or angled lines stereoscopically or abruptly changing the colors of the curved or angled lines.

The embodiment allows for providing a game machine 1 equipped with a display device 2.

Second Embodiment

Another embodiment herein is described below on the basis of FIG. 11. For the sake of convenience, components previously described in an embodiment that have an identical function are given the same reference numerals, and explanations therefor are omitted.

Figure 11:
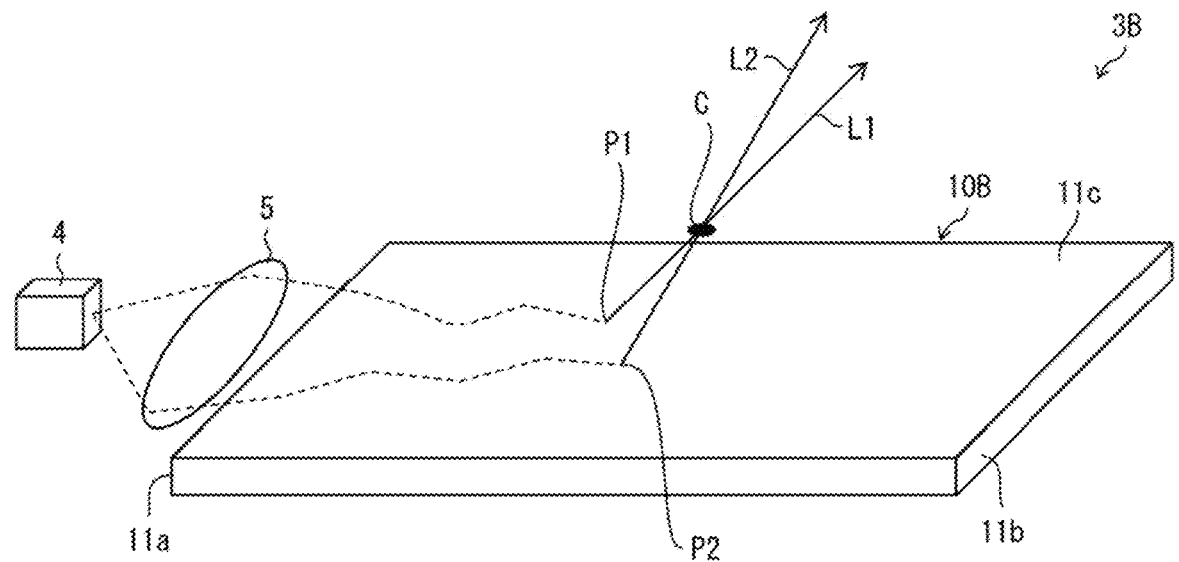
FIG. 11 is a perspective view illustrating a configuration of a light emitting device according to a second embodiment.

FIG. 11 is a perspective view illustrating a configuration of a light emitting device 3B according to the embodiment; as illustrated in FIG. 11, the light emitting device 3B includes a light guide plate 10B and a condenser 5 functions as an optical component. A single light source 4 is placed at the side surface 11a pf the light guide plate 10B in this embodiment.

The condenser 5 is an optical system for focusing the light emitted from the light source 4. The condenser 5 is placed between the light source 4 and the light guide plate 10B. The condenser 5 focuses the light emitted from the light source 4 and causes the light to enter at the side surface 11a of the light guide plate 10B. Consequently, the beam diameter of the light gradually decreases in the direction the light travels to enter at the side surface 11a of the light guide plate 10B.

Therefore, when viewed from a direction perpendicular to the emission surface 11c of the light guide plate 10B, the light inside the light guide plate 10B is guided such that the width of the light decreases gradually in a direction perpendicular to the direction the light travels. If deflectors 12 with slanted surfaces 12a perpendicular to the incidence direction are used to reflect the aforementioned light, the light, a first emission light L1 and a second emission light L2 are suitably emitted from the emission surface 11c so that an intersection point C is located toward, for instance, an observer relative to the emission surface 11c.

Thus, if the intersection point C is located on the observer side relative to the emission surface 11c, to the observer the emission point appears to be protruding from in front of the emission surface 11c. Accordingly, it is possible to provide a stereoscopic display of a stereoscopic image SI that appears to be protruding.

As above described, the light emitting device 3B is provided with a light source 4, a light guide plate 10B, and a condenser 5 situated between the light source 4 and the light guide plate 10B; the condenser 5 concentrates the light emitted from the light source 4 and causes the light to enter the light guide plate 10B.

The embodiment allows for implementing a light guide plate 10B and a light emitting device 3B that suitably present a stereoscopic image SI that appear to be protruding.

The extent to which the stereoscopic image SI protrudes may be designed by changing the reflection angle created by the deflectors 12. As an example, when desiring to present a certain portion of the stereoscopic image SI as more protruded, the reflection angle created by the corresponding deflectors 12 may be configured so that an angle θ at an intersection point C between a straight line passing through a first point P1 and the center of the one eye E1 and a straight line passing through a second point P2 and the center of the other eye E2 is smaller.

Third Embodiment

Another embodiment herein is described below on the basis of FIG. 12 and FIGS. 13A, 13B, and 13C. For the sake of convenience, components previously described in an embodiment that have an identical function are given the same reference numerals, and explanations therefor are omitted.

Figure 12:
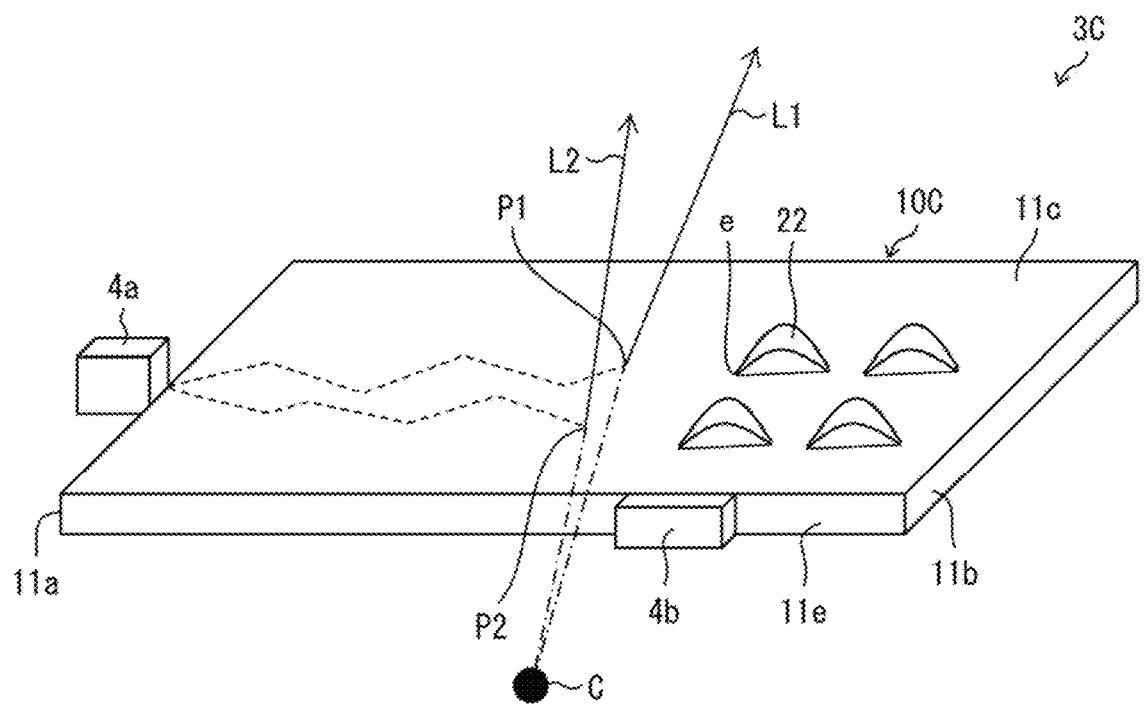
FIG. 12 is a perspective view illustrating a configuration of a light emitting device according to a third embodiment.

FIG. 12 is a perspective view illustrating a configuration of a light emitting device 3C according to a third embodiment; as illustrated in FIG. 12, the light emitting device 3C includes a first light source 4a and a second light source 4b as light sources, and a light guide plate 10C with second deflectors 22 formed thereon.

The first light source 4a is the aforementioned light source 4 and is provided along the side surface 11a which is the incidence surface of the light guide plate 10C.

The second light source 4b is a light emitting element that emits light to the light guide plate 10C; a plurality of second light sources 4b may be arranged along the side surface 11e which is orthogonal to the side surface 11a at which the first light source 4a is arranged and the emission surface 11c. The light emitted from the second light source 4b is incident on the light guide plate 10C from the side surface 11e, is reflected by a second deflector 22 and is emitted from the emission surface 11c.

The light guide plate 10C is a light guide element that guides light from the first light source 4a entering therein from the side surface 11a, so that the light is emitted from the emission surface 11a. In the embodiment the light guide plate 10C includes the aforementioned deflectors 12 and a plurality of the second deflectors 22 formed thereon with pointed tip portions e.

The second deflectors 22 are arranged with the tip portions e facing the side surface 11a, which is the incidence surface [of the light guide plate]. Hereby, the second deflectors 22 reflect only the light from the second light source 4b entering via the side surface 11e which is orthogonal to the side surface 11a and the emission surface 11c without reflecting the light from the first light source 4a entering via the side surface 11a.

Figure 13A:
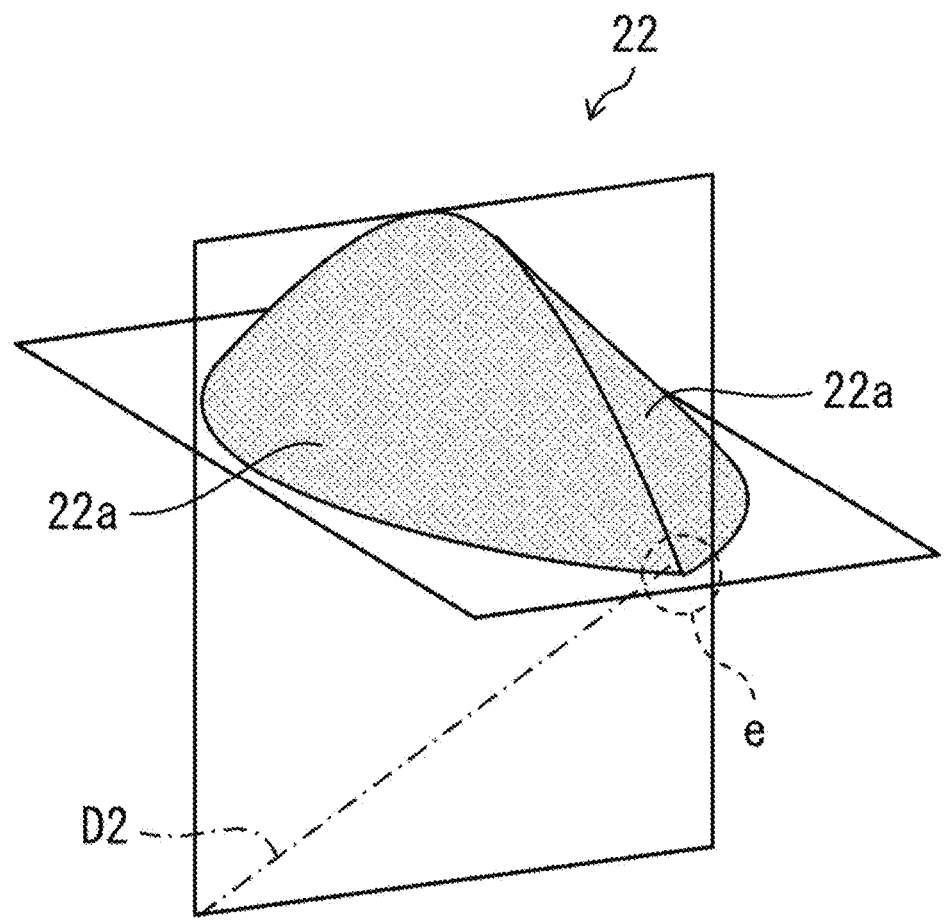
FIG. 13A is a perspective view for describing the shape of second deflectors formed on the light guide plate of the light emitting device.
Figure 13B:
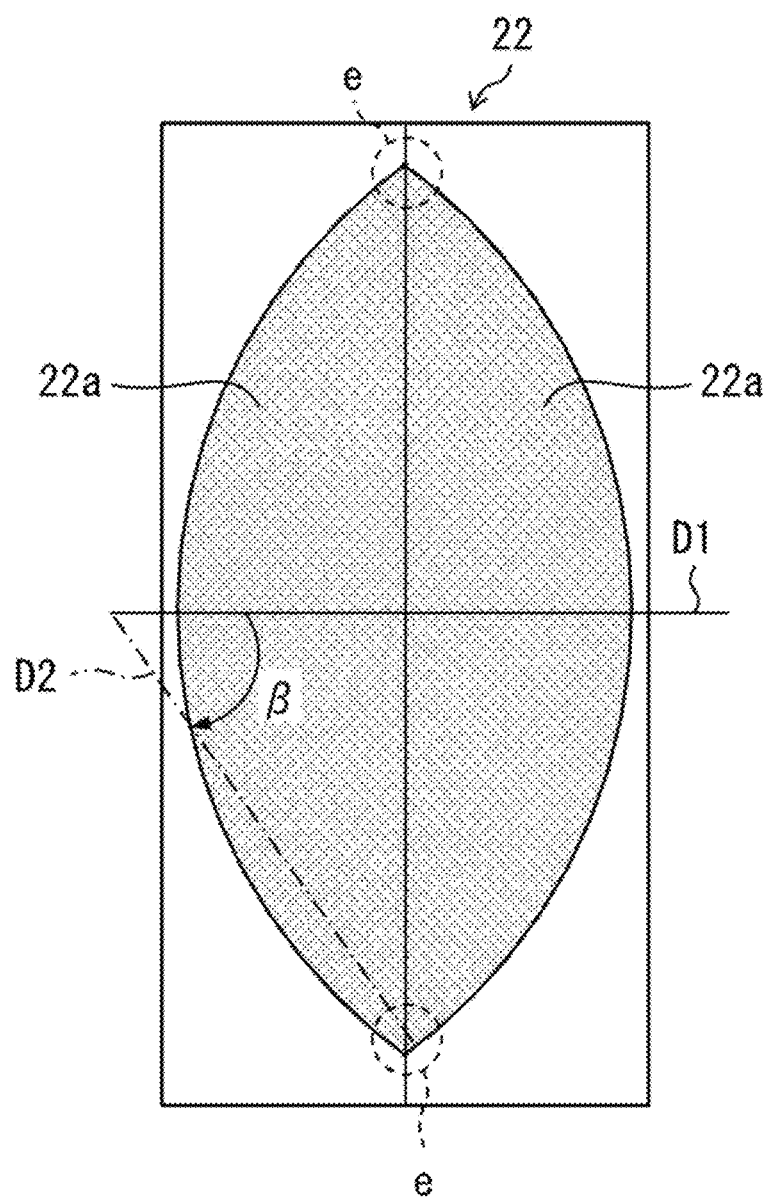
FIG. 13B is the plan view.

FIG. 13A is a perspective view for describing the shape of the second deflectors 22; FIG. 13B is the plan view; and FIG. 13C is the side view.

Figure 13C:
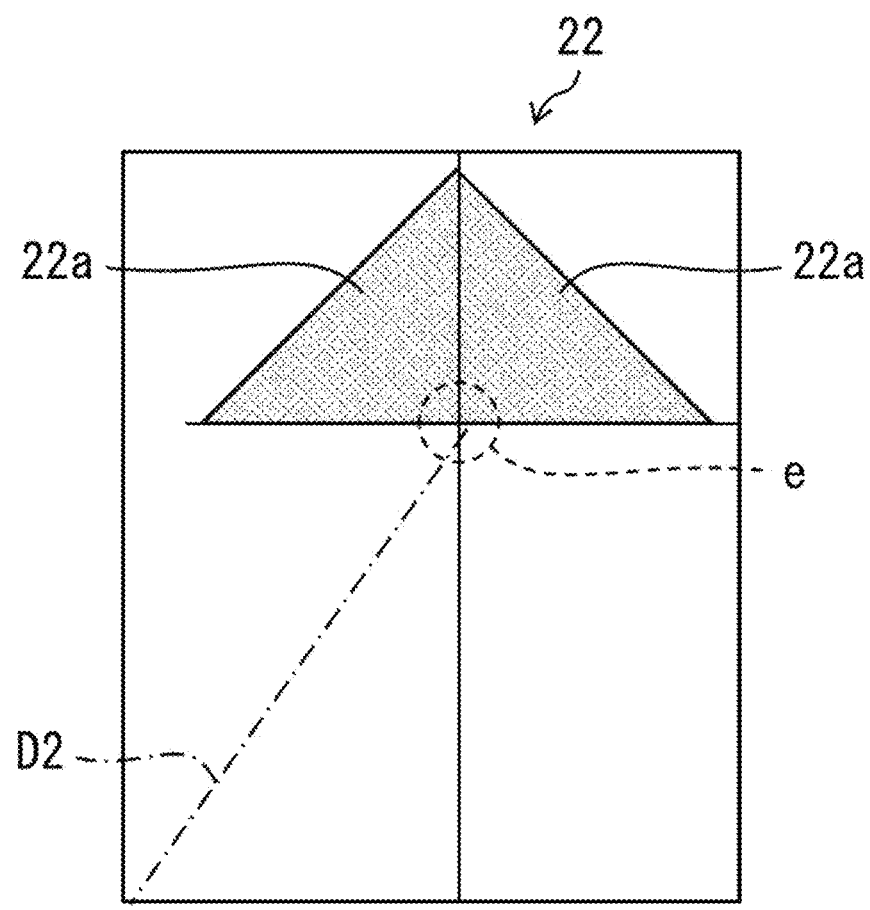
FIG. 13C is the side view.

The second deflectors 22 may be configured such that the pointed tip portion e is arranged in a direction orthogonal to the direction D1 light travels from the second light source 4b as illustrated in FIGS. 13A through 13C. An angle θ between the direction D1 light travels from the second light source 4b and the normal direction D2 of the edge of a reflection surface 22a on a second deflector 22 connected to the tip portion e may be −38.327×2+152.3×4.014 (where x is the refractive index of the light guide plate 10C).

Providing the light guide plate 10C with second deflectors 22 thus configured can more suitably prevent the second deflectors 22 from emitting the light from the light source 4 incident from side surface 11a. Therefore, this makes it possible to produce a stereoscopic image SI corresponding to the second deflectors 22.

As above described, the light emitting device 3C is provided with a first light source 4a and a second light source 4b, and a light guide plate 10C with deflectors 12 and second deflectors 22 which serve as deflectors for a second light source formed thereon.

The light emission from the first light source 4a and light emission from the second light source 4b do not affect each other in the light emitting device 3C; the light emitting device 3C presents a stereoscopic image SI corresponding to the deflectors 12 via light emission from the first light source 4a, and presents a stereoscopic image SI corresponding to the second deflectors 22 via light emission from the second light source 4b.

More specifically, the second deflectors 22 can be prevented from emitting the light from the first light source 4a incident from side surface 11a given that the pointed tip portions e of the second deflectors 22 are placed toward the side surface 11a of the light guide plate 10C in the light emitting device 3C. Therefore, the light guide plate 3C can produce a stereoscopic image SI corresponding to the deflectors 12 due to the first light source 4a and a stereoscopic image SI corresponding to the second deflectors 22 due to the second light source 4b. As a result, if, for instance, the stereoscopic image SI is located opposite to an observer relative to the emission surface 11c, a stereoscopic image SI corresponding to the deflectors 12 can be made to appear to the observer to be further back relative to a stereoscopic image SI corresponding to the second deflectors 22.

Therefore, according to the present embodiment it is possible to achieve a light emitting device 3C capable of stereoscopic display of a floating stereoscopic image SI where the stereoscopic image SI corresponding to the second deflectors 22 appears to be floating.

Fourth Embodiment

Another embodiment herein is described below on the basis of FIG. 14 and FIG. 15. For the sake of convenience, components previously described in an embodiment that have an identical function are given the same reference numerals, and explanations therefor are omitted.

Figure 14:
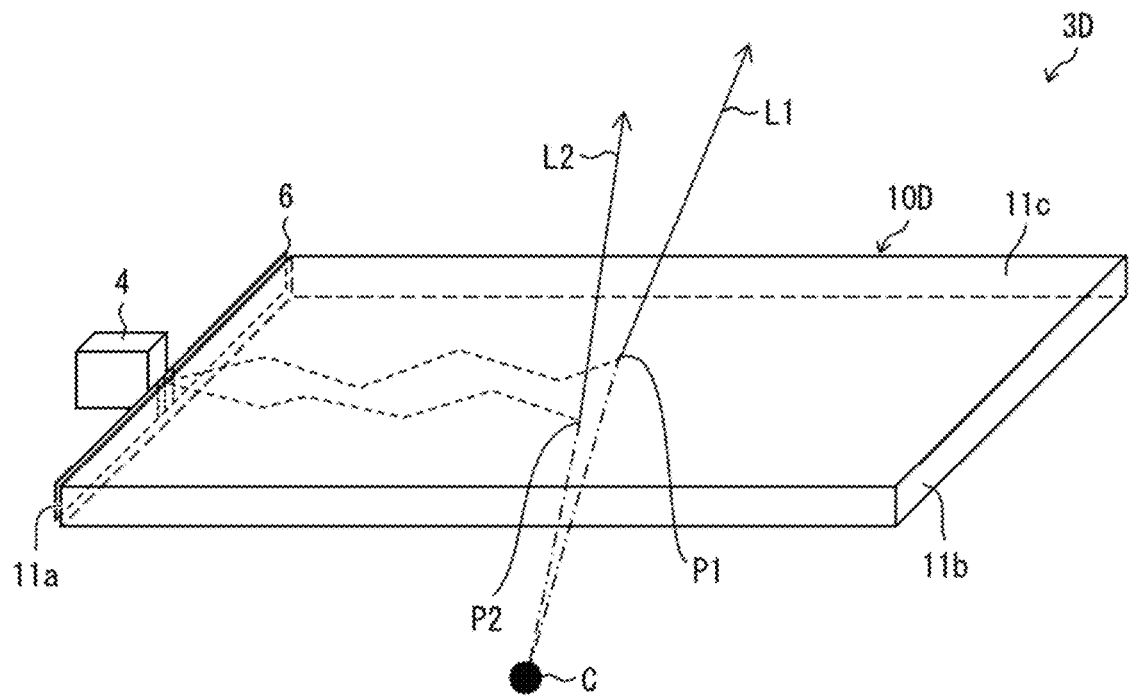
FIG. 14 is a perspective view illustrating a configuration of a light emitting device according to a fourth embodiment.
Figure 15:
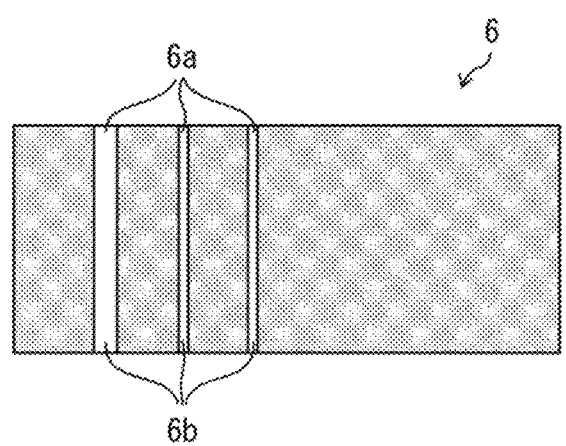
FIG. 15 is a front view illustrating a configuration of a mask in the light emitting device.

FIG. 14 is a perspective view illustrating a configuration of a light emitting device 3D according to the embodiment; and FIG. 15 is a front view illustrating a configuration of a mask 6 provided on the side surface 11a which serves as an incidence surface of a light guide plate 10D in the light emitting device 3D.

As illustrated in FIG. 14 and FIG. 15, the light emitting device 3D of the embodiment includes a light source 4, a light guide plate 10D, and a mask 6 that serves as a masking component.

The mask 6 is a sheet-like component with the ability to block light. The mask 6 is placed between the light source 4 and the light guide plate 10D, and includes a slit 6a that allows light emitted from the light source 4 to pass therethrough.

The slit 6a is formed parallel to the side surface 11a of the light guide plate 10D along a direction roughly orthogonal to the side surface 11c. Therefore, the light that passes through a slit 6a in the mask 6 is incident via the side surface 11a of the light guide plate 10D whereby the width of the light entering the light guide plate 10D can be reduced. As a result, finer and sharper rays of light can be used to present the stereoscopic image SI.

A plurality of slits 6a may be provided; in that case, the width of each slit 6a may be different. Thus, a stereoscopic image SI made up of a plurality of light rays with different widths may be presented.

A color film 6b may be added to a slit 6a. Thus, the stereoscopic image SI can be presented with a color different from the color of the light source 4.

In addition to providing a plurality of slits 6a in the mask 6, a different color film 6b may be added to each slit 6a. Thus, the stereoscopic image SI may be presented with a plurality of colors.

As above described, the light emitting device 3D includes a light source 4, a light guide plate 10D, and a mask 6 placed between the light source 4 and the light guide plate 10D; the mask 6 may include at least one slit 6a that allows light emitted from the light source 4 to pass therethrough.

Therefore, the width of the light entering the light guide plate 10D in the light emitting device 3D can be reduced because the light that passes through a slit 6a in the mask 6 is incident via the side surface 11a of the light guide plate 10D. Accordingly, the embodiment can achieve a light emitting device 3D capable of presenting the stereoscopic image SI using finer and sharper rays of light.

Fifth Embodiment

Another embodiment herein is described below on the basis of FIG. 16 and FIG. 17. For the sake of convenience, components previously described in an embodiment that have an identical function are given the same reference numerals, and explanations therefor are omitted.

Figure 16:
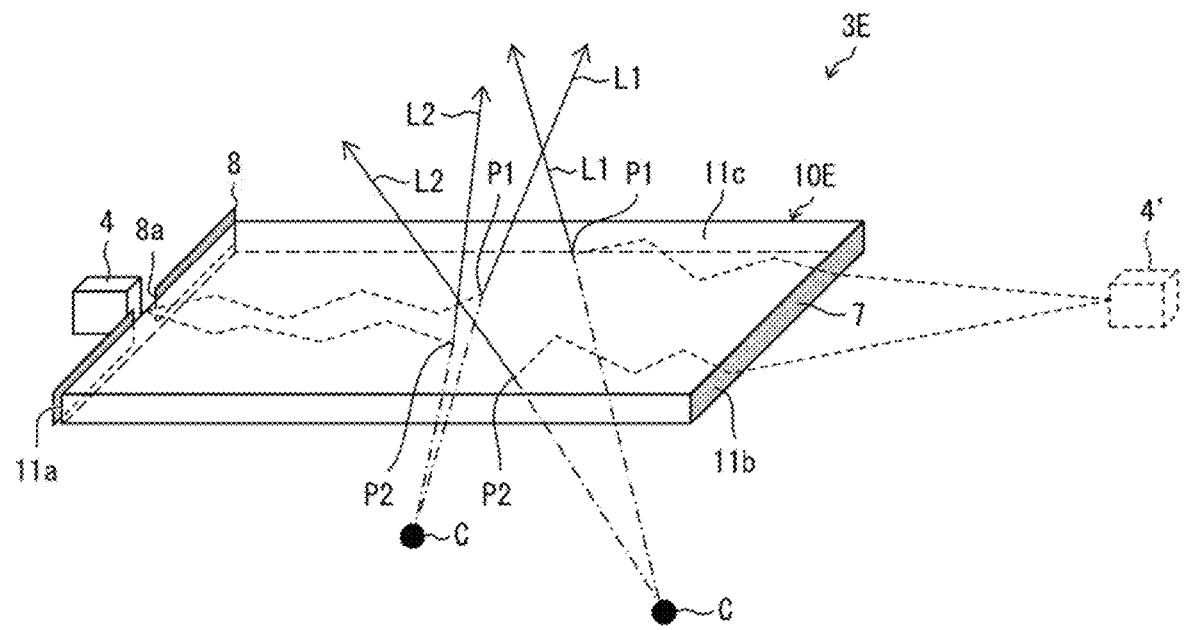
FIG. 16 is a perspective view illustrating a configuration of a light emitting device according to a fifth embodiment.

FIG. 16 is a perspective view illustrating a configuration of a light emitting device 3E according to the embodiment; as illustrated in FIG. 16, the light emitting device 3E of the embodiment includes a light source 4, a light guide plate 10E, and a first reflector component 7 and a second reflector component 8.

The first reflector component 7 is arranged along the side surface 11b opposite the side surface 11a at which the light source 4 is placed in the light guide plate 10E. Light enters the light guide plate 10E from the light source 4 placed at the side surface 11a, and the light guide plate 10E guides the light therethrough to the opposing side surface 11b; the first reflector component 7 reflects the light arriving at the side surface 11b, returning the light toward the side surface 11a.

The first reflector component 7 is placed at the side surface 11b; hereby, for light that travels from the light source 4 but not reflected by the deflectors 12 (not shown) and arrives at the side surface 11b of the light guide plate 10E, the first reflector component 7 reflects said light toward the side surface 11a to re-orient the light toward the deflectors 12. Hereby, the effect is similar to placing a pseudo light source 4' at the side surface 11b of the light guide plate 10E, making it possible to emit the light from the light source 4 that reaches the side surface 11b from the emission surface 11c. Accordingly, this increases the light use efficiency in the light emitting device 3E.

The second reflector component 8 includes a gap 8a and is placed along the side surface 11a, which is the incidence surface at the light source 4. The light guide plate 10E guides the light reflected by the first reflector component 7 therethrough, and the second reflector component 8 reflects the light arriving at the side surface 11a back toward the side surface 11b.

The aforesaid gap 8a is provided in the second reflector component 8 at the portion opposite the light source 4 so that light emitted by the light source 4 can enter the light guide plate 10E from the side surface 11a. The light emitted by the light source 4 passes through the gap 8a and enters the light guide plate 10E from the side surface 11a.

The second reflector component 8 is placed at the side surface 11a; hereby, for light reflected by the first reflector component 7 and returning to the side surface 11a of the light guide plate 10E but not reflected by the deflectors 12, the second reflector component 8 reflects said light toward the side surface 11b, to re-orient the light toward the deflectors 12. Accordingly, this further increases the light use efficiency in the light emitting device 3E since the light returned to the side surface 11a can be emitted from the emission surface 11c.

Figure 17:
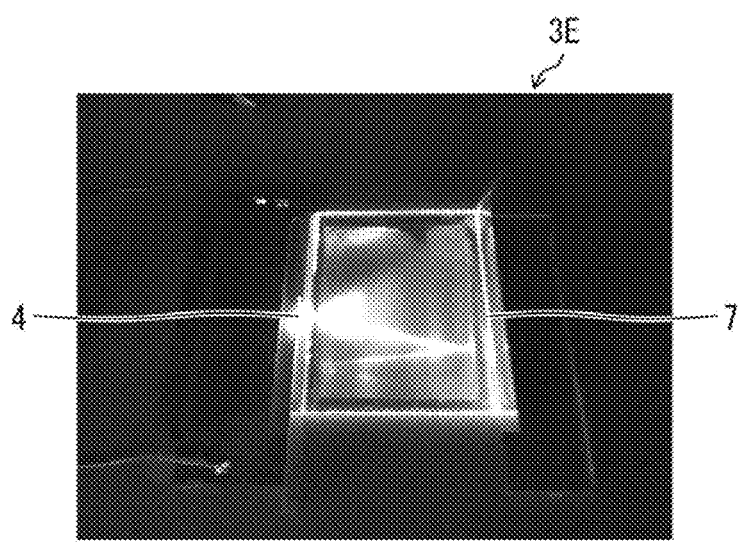
FIG. 17 is a perspective view illustrating an example of a light emitting state in the light emitting device.

FIG. 17 is a perspective view illustrating an example of a light emitting state in the light emitting device 3E; as illustrated in FIG. 17, the light emitting device 3E is capable of presenting stereoscopic images SI of a line that travels from the side surface 11a that is at the light source 4, and a line that returns from the side surface 11b due to the first reflector component 7.

As above described, a light emitting device 3E of the embodiment is provided with a light source 4 and a light guide plate 10E, and a first reflector component 7 and a second reflector component 8 with the first reflector component 7 at the side surface 11b and the second reflector component 8 at the side surface 11a.

Light from the light source 4 that is not reflected by the deflectors 12 and arriving at the side surface 11b of the light guide plate 10E is reflected toward the side surface 11a by the first reflector component 7 and re-oriented toward the deflectors 12 in the light emitting device 3E.

Light reflected by the first reflector component 7 and returning to the side surface 11a of the light guide plate 10E without being reflected by the deflectors 12 is reflected toward the side surface 11b due to the second reflector component 8 and re-oriented toward the deflectors 12.

Accordingly, this embodiment can achieve a light emitting device 3E with increased light use efficiency.

Overview

A light guide plate according to an embodiment of the present invention is for presenting a stereoscopic image via parallax, the light guide plate including a plurality of deflectors arranged in rows parallel to an incidence surface through which light from a light source enters the light guide plate, the light totally reflecting inside the light guide plate while being guided therethrough, the plurality of deflectors including a reflection surface for reflecting and causing an emission surface to emit said light; and the reflection surfaces in a row of a plurality of deflectors all oriented in the same direction with the orientation of the reflection surfaces changing for each row in accordance with distance from the incidence surface.

The reflection surfaces of the plurality of deflectors arranged in rows parallel to the incidence surface would all be oriented parallel to the incidence surface in all the rows for a conventional light guide plate of this type. As a result, it was not possible to present anything but a straight line along a direction from the incidence surface toward a surface opposite said incidence surface when presenting a stereoscopic image via parallax.

Therefore, a light guide plate according to an embodiment of the present invention is configured such that the reflection surfaces in a row of a plurality of deflectors are all oriented in the same direction with the orientation of the reflection surfaces changing for each row in accordance with distance from the incidence surface in a light guide plate according to an embodiment of the present.

As a result, a curved or angled line can be presented along a direction from the incidence surface toward a surface opposite said incidence surface when presenting a stereoscopic image via parallax.

Therefore, it is possible to provide a light guide plate that can achieve stereoscopic display of a curved line or angled line traveling from the incidence surface for light from the light source toward an opposing surface opposite said incidence surface.

A light guide plate according to an embodiment of the invention is configured such that the angle of a reflection surface relative to the incidence surface, which is the orientation of the reflection surface in the plurality of deflectors in a row, changes by increasing or decreasing continuously and consecutively in accordance with distance from the incidence surface.

Hereby, the angle of a reflection surface relative to the incidence surface, which is the orientation of the reflection surface in the plurality of deflectors changes so that the image-forming location of a stereoscopic image presented via parallax moves continuously and consecutively by row from said incidence surface toward the opposing surface of the incidence surface.

Therefore, it is possible to provide a light guide plate that can concretely achieve stereoscopic display of a curved line from the incidence surface for light from the light source toward an opposing surface opposite said incidence surface.

A light guide plate according to an embodiment of the invention is configured such that the angle of a reflection surface relative to the incidence surface, which is the orientation of the reflection surface in the plurality of deflectors in a row, changes discretely in accordance with distance from the incidence surface.

Hereby, for instance, if the orientation of the reflection surfaces on the plurality of deflectors keeps the imaging forming location of the stereoscopic image SI the same continuously over a plurality of rows from the incidence surface toward the opposing surface of the incidence surface, then it is possible to present a stereoscopic image SI of a straight line. Further, if an angle relative to the incidence surface, that is, the orientation of the reflection surfaces on the plurality of deflectors for each row changes in accordance with the distance from the incidence surface to increase or decrease discretely and then kept the same continuously over several rows, the aforementioned straight line suddenly changes direction, causing a stereoscopic image SI of a straight line to be presented. It is thus possible to present a stereoscopic image SI of an angled line such as a zigzag line.

A light emitting device according to an embodiment of the present invention is configured to include the aforementioned light guide plate and a plurality of light sources arranged parallel to the incidence surface of the light guide plate.

The configuration makes it possible to provide a light emitting device that can achieve stereoscopic display of a curved line or angled line from the incidence surface for light from the light source toward an opposing surface opposite said incidence surface.

A light emitting device according to an embodiment of the present invention is configured to further include an optical component between the light sources and the light guide plate; and the optical component focuses the light emitted from the light source and causes the light to enter the light guide plate.

Hereby, light focused by the optical component is incident on the light guide plate. When the light focused by the optical component is reflected by the deflectors, the light is emitted in an angular range where the intersection point due to parallax is located toward the observer relative to the emission surface. It is therefore possible to suitably provide a stereoscopic display that appears to be protruding.

A light emitting device according to an embodiment of the present invention is configured such that the light sources include a first light source arranged along the incidence surface of the light guide plate, and a second light source arranged along a side surface orthogonal to the incidence surface and the emission surface of the light guide plate; the light guide plate including a plurality of deflectors for reflecting the light from the first light source, and a plurality of second deflectors for reflecting the light from the second light source; and the light emitting device presenting a stereoscopic image corresponding to the deflectors from the light emitted from the first light source, and presenting a stereoscopic image corresponding to the second-light-source deflector from the light emitted from the second light source without the light emitted from the first light source and the light emitted from the second light source affecting each other.

Hereby, a stereoscopic image corresponding to the deflectors is presented from light emitted from the first light source, and a stereoscopic image is presented corresponding to the second deflectors from light emitted from the second light source without the light emitted from the first light source and the light emitted from the second light source affecting each other. As a result, if, for instance, the stereoscopic image is located opposite to an observer relative to the emission surface, a stereoscopic image corresponding to the deflectors can be made to appear to the observer to be further back relative to a stereoscopic image corresponding to the second light source deflector.

A light emitting device according to an embodiment of the present invention is configured to further include a mask component arranged between the light sources and the light guide plate; and the mask component preferably includes at least one slit for allowing light emitted from the light source to pass therethrough.

Hereby, the light passing through the slit in the mask component enters the light guide plate through the incidence surface, making it possible to narrow the width of incident light. It is thus possible stereoscopically to present a stereoscopic image made up of finer rays of light.

A light emitting device according to an embodiment of the present invention is configured to further include a reflector component arranged at an opposing side surface of the light guide plate opposite the incidence surface whereat the light sources are arranged; and for the light from the light sources directed through the light guide plate and arriving at the opposite side surface, the reflector component reflects said light toward the incidence surface.

Hereby, light from the light sources not reflected by the deflectors and arriving at the opposing side surface of the light guide plate is reflected by the reflector component and re-oriented toward the deflectors. Thus, the light use efficiency increases because it is possible to emit the light emitted from the light sources and reaching the opposing side surface from the emission surface.

A display device according to an embodiment of the present invention is provided with the light emitting device.

The configuration makes it possible to provide a display device with a light emitting device that can achieve stereoscopic display of a curved line or angled line from the incidence surface for light from the light source toward an opposing surface opposite said incidence surface.

A display device according to an embodiment of the present invention is provided with a controller that controls at least one of the emission time of a light source in the light emitting device and the switching between a plurality of light sources that emit mutually different colors.

Hereby, the display device can provide effects by abruptly presenting curved lines or angled lines stereoscopically or abruptly changing the colors of the curved or angled lines.

A game machine according to an embodiment of the present invention is provided with the display device.

The configuration makes it possible to provide a game machine with a display device that can achieve stereoscopic display of a curved line or angled line from the incidence surface for light from the light source toward an opposing surface opposite said incidence surface.

The present invention is not limited to each of the above described embodiments, and may be modified in various ways and remain within the scope of the claims. The technical means disclosed in each of the different embodiments may be combined as appropriate, and an embodiment obtained in such a manner remains within the technical scope of the present invention. Moreover, the technical means disclosed in each of the different embodiments may be combined to produce a new technical feature.

REFERENCE NUMERALS

1 Game machine
2 Display device

2a Image display
3A-3E Light emitting device
4 Light source
4a First light source
4b Second light source
5 Condenser (optical component)
6 Mask (mask component)
6a Slit
6b Color film
7 First reflector component
8 Second reflector component
8a Gap
10A-10E Light guide plate
11a Side surface (incidence surface)
11b Side surface (opposing surface)
11c Emission surface
11d Lower surface
11e Side surface
12 Deflector
12a Slanted surface (reflection surface)
12X First deflector group
12Y Second deflector group
22 Second deflector
22a Reflection surface
C1, C2, Cn Intersection point
E1 One eye
E2 Other eye
e Tip portion
L1 First emission light
L2 Second emission light
P1 First point
P2 Second point
α Angle relative to side surface (orientation of reflection surface)
α1 First angle (first orientation)
α2 Second angle (second orientation)
β, θ Angle

The invention claimed is:

1. A light guide plate for presenting a stereoscopic image via parallax, the light guide plate comprising:
a plurality of deflectors arranged in rows parallel to an incidence surface through which light from a light source enters the light guide plate, the light totally reflecting inside the light guide plate while being guided therethrough, the plurality of deflectors comprising a reflection surface for reflecting and causing an emission surface to emit said light, wherein
the reflection surfaces in a row of the plurality of deflectors are all oriented in the same direction with the orientation of the reflection surfaces changing for each row in accordance with distance from the incidence surface.

2. The light guide plate according to claim 1, wherein an angle of a reflection surface relative to the incidence surface, which is the orientation of the reflection surface in the plurality of deflectors in a row, changes by increasing or decreasing continuously and consecutively in accordance with distance from the incidence surface.

3. A light emitting device comprising: a light guide plate according to claim 2; and a plurality of light sources arranged parallel to the incidence surface of the light guide plate.

4. The light emitting device according to claim 3, further comprising an optical component between the light sources and the light guide plate, wherein the optical component focuses the light emitted from the light source and causes the light to enter the light guide plate.

5. The light emitting device according to claim 3, wherein: the light sources comprise a first light source arranged along the incidence surface of the light guide plate, and a second light source arranged along a side surface orthogonal to the incidence surface and the emission surface of the light guide plate;
the light guide plate comprising the deflector for reflecting the light from the first light source, and a plurality of second deflectors for reflecting the light from the second light source; and
the light emitting device presenting a stereoscopic image corresponding to the deflectors from the light emitted from the first light source, and presenting a stereoscopic image corresponding to the second deflector from the light emitted from the second light source without the light emitted from the first light source and the light emitted from the second light source affecting each other.

6. The light emitting device according to claim 3, further comprising a mask component arranged between the light sources and the light guide plate, wherein
the mask component comprises at least one slit for allowing light emitted from the light source to pass therethrough.

7. The light emitting device according to claim 3, further comprising a reflector component arranged at an opposing side surface of the light guide plate opposite the incidence surface whereat the light sources are arranged, wherein
for the light from the light sources directed through the light guide plate and arriving at the opposing side surface, the reflector component reflects the light toward the incidence surface.

8. A display device comprising a light emitting device according to claim 3.

9. The display device according to claim 8, further comprising a controller for controlling at least one of an emission time of a light source in the light emitting device and the switching between a plurality of light sources that emit mutually different colors.

10. A game machine comprising a display device according to claim 8.

11. The light guide plate according to claim 1, wherein an angle of a reflection surface relative to the incidence surface, which is the orientation of the reflection surface of the plurality of deflectors in a row, changes discretely in accordance with distance from the incidence surface.

12. A light emitting device comprising: a light guide plate according to claim 1; and a plurality of light sources arranged parallel to the incidence surface of the light guide plate.

13. The light emitting device according to claim 12, further comprising: an optical component between the light sources and the light guide plate, wherein
the optical component focuses the light emitted from the light source and causes the light to enter the light guide plate.

14. The light emitting device according to claim 12, wherein: the light sources comprise a first light source arranged along the incidence surface of the light guide plate, and a second light source arranged along a side surface orthogonal to the incidence surface and the emission surface of the light guide plate;

the light guide plate comprises the deflector for reflecting the light from the first light source, and a plurality of second deflectors for reflecting the light from the second light source; and the light emitting device presents a stereoscopic image corresponding to the deflectors from the light emitted from the first light source, and presents a stereoscopic image corresponding to the second deflector from the light emitted from the second light source without the light emitted from the first light source and the light emitted from the second light source affecting each other.

15. The light emitting device according to claim 12, further comprising a mask component arranged between the light sources and the light guide plate, wherein the mask component comprises at least one slit for allowing light emitted from the light source to pass therethrough.

16. The light emitting device according to claim 12, further comprising a reflector component arranged at an opposing side surface of the light guide plate opposite the incidence surface whereat the light sources are arranged, wherein for the light from the light sources directed through the light guide plate and arriving at the opposing side surface, the reflector component reflects the light toward the incidence surface.

17. A display device comprising a light emitting device according to claim 12.

18. The display device according to claim 17, further comprising a controller for controlling at least one of an emission time of a light source in the light emitting device; and the switching between a plurality of light sources that emit mutually different colors.

19. A game machine comprising: a display device according to claim 17.

* * * * *

UNITED STATES PATENT AND TRADEMARK OFFICE
CERTIFICATE OF CORRECTION

PATENT NO. : 11,806,606 B2
APPLICATION NO. : 16/963296
DATED : November 7, 2023
INVENTOR(S) : Jun Kishimoto and Yoshihiko Takagi It is certified that error appears in the above-identified patent and that said Letters Patent is hereby corrected as shown below:

In the Claims

Claims 3-13, 18, 19 should be replaced as follows:

3. The light guide plate according to claim 1, wherein an angle of a reflection surface relative to the incidence surface, which is the orientation of the reflection surface of the plurality of deflectors in a row, changes discretely in accordance with distance from the incidence surface.

4. A light emitting device comprising: a light guide plate according to claim 1; and a plurality of light sources arranged parallel to the incidence surface of the light guide plate.

5. The light emitting device according to claim 4, further comprising: an optical component between the light sources and the light guide plate, wherein
the optical component focuses the light emitted from the light source and causes the light to enter the light guide plate.

6. The light emitting device according to claim 4, wherein:
 the light sources comprise a first light source arranged along the incidence surface of the light guide plate, and a second light source arranged along a side surface orthogonal to the incidence surface and the emission surface of the light guide plate;
 the light guide plate comprises the deflector for reflecting the light from the first light source, and a plurality of second deflectors for reflecting the light from the second light source; and
 the light emitting device presents a stereoscopic image corresponding to the deflectors from the light emitted from the first light source, and presents a stereoscopic image corresponding to the second deflector from the light emitted from the second light source without the light emitted from the first light source and the light emitted from the second light source affecting each other.

7. The light emitting device according to claim 4, further comprising a mask component arranged between the light sources and the light guide plate, wherein Signed and Sealed this
Twentieth Day of August, 2024

Katherine Kelly Vidal
*Director of the United States Patent and Trademark Office* the mask component comprises at least one slit for allowing light emitted from the light source to pass therethrough.

8. The light emitting device according to claim 4, further comprising a reflector component arranged at an opposing side surface of the light guide plate opposite the incidence surface whereat the light sources are arranged, wherein
    for the light from the light sources directed through the light guide plate and arriving at the opposing side surface, the reflector component reflects the light toward the incidence surface.

9. A display device comprising a light emitting device according to claim 4.

10. The display device according to claim 9, further comprising a controller for controlling:
    at least one of an emission time of a light source in the light emitting device; and
    the switching between a plurality of light sources that emit mutually different colors.

11. A game machine comprising: a display device according to claim 9.

12. A light emitting device comprising: a light guide plate according to claim 2; and a plurality of light sources arranged parallel to the incidence surface of the light guide plate.

13. The light emitting device according to claim 12, further comprising an optical component between the light sources and the light guide plate, wherein
    the optical component focuses the light emitted from the light source and causes the light to enter the light guide plate.

18. The display device according to claim 17, further comprising a controller for controlling:
    at least one of an emission time of a light source in the light emitting device; and
    the switching between a plurality of light sources that emit mutually different colors.

19. A game machine comprising a display device according to claim 17.